United States Patent
Saarinen

(10) Patent No.: US 12,470,376 B2
(45) Date of Patent: Nov. 11, 2025

(54) CRYPTOGRAPHIC SYSTEM FOR POST-QUANTUM CRYPTOGRAPHIC OPERATIONS

(71) Applicant: PQShield Ltd, Oxford (GB)

(72) Inventor: Markku-Juhani Olavi Saarinen, Oxford (GB)

(73) Assignee: PQShield Ltd, Oxford (GB)

( * ) Notice: Subject to any disclaimer, the term of this patent is extended or adjusted under 35 U.S.C. 154(b) by 18 days.

(21) Appl. No.: 18/412,267

(22) Filed: Jan. 12, 2024

(65) Prior Publication Data
US 2025/0080334 A1    Mar. 6, 2025

Related U.S. Application Data

(63) Continuation of application No. PCT/GB2022/051829, filed on Jul. 14, 2022.

(30) Foreign Application Priority Data

Jul. 15, 2021    (GB) .................................... 2110207

(51) Int. Cl.
H04L 9/08    (2006.01)

(52) U.S. Cl.
CPC .................................. H04L 9/0852 (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS 3,911,330 A    10/1975    Fletcher et al.
4,589,120 A    5/1986    Mendala
(Continued)

FOREIGN PATENT DOCUMENTS

CN    103812643 A    5/2014
CN    107800532 A    3/2018
(Continued)

OTHER PUBLICATIONS

Peter Schwabe and Ko Stoffelen. All the AES you need on cortex-m3 and M4.In Roberto Avanzi and Howard M. Heys, editors, Selected Areas in Cryptog-raphy—SAC 2016—23rd International Conference, St. John's, NL, Canada, Aug. 10-12, 2016, Revised Selected Papers, vol. 10532 of Lecture Notes inComputer Science, pp. 180-194. Springer, 2016. URL: https://doi.org/10.1007/978-3-319-69453-5_10, doi:10.1007/978-3-319-69453-5\_10.
(Continued)

*Primary Examiner* — Sharif E Ullah
(74) *Attorney, Agent, or Firm* — EIP US LLP

(57) ABSTRACT

Certain examples described herein relate to at least a cryptographic system and a method of operating a cryptographic system. The cryptographic system may be implemented as a co-processor for performing post-quantum cryptographic functions. The cryptographic system has a set of bus interfaces for coupling to an external computing system, a cryptographic math unit and a control unit. The cryptographic math unit in certain examples is adapted to provide one or more masked modes of operation that secure the cryptographic operations against side-channel and non-invasive attacks. The method of operating a cryptographic system involves annotating secret data and tracking those annotations through one or more arithmetic operations.

21 Claims, 5 Drawing Sheets

(58) Field of Classification Search
CPC ....... H04L 9/3226; H04L 9/0891; H04L 9/14;
H04L 9/0827; H04L 2209/24; H04L 9/08;
H04L 9/0819; H04L 9/088; H04L 9/0844;
H04L 9/0618; H04W 12/041; H04W
12/0431; H04W 12/0433; H04W 12/04;
H04W 12/61; H04W 12/63; H04W 12/71;
G06F 21/31; G06F 21/44; G06F 7/588;
G06F 21/72; G06F 21/86
USPC .......... 380/28, 255, 264, 276; 726/2, 21, 36;
713/150, 163, 181
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,407,766 | B1 * | 6/2002 | Ramanujan | B41J 2/465 347/255 |
| 6,748,083 | B2 * | 6/2004 | Hughes | H04L 9/0858 380/278 |
| 7,437,081 | B2 * | 10/2008 | Mitchell | H04B 10/70 398/154 |
| 8,194,855 | B2 * | 6/2012 | Shantz | G06F 7/5324 380/44 |
| 8,538,012 | B2 | 9/2013 | Dixon et al. | |
| 8,572,410 | B1 * | 10/2013 | Tkacik | H04L 9/0861 713/192 |
| 8,761,401 | B2 * | 6/2014 | Sprunk | H04L 9/0844 380/278 |
| 8,782,774 | B1 * | 7/2014 | Pahl | H04L 9/0841 726/4 |
| 8,855,316 | B2 * | 10/2014 | Wiseman | H04L 9/0855 380/278 |
| 8,971,538 | B1 * | 3/2015 | Marr | G06F 21/00 380/285 |
| 9,628,268 | B2 * | 4/2017 | Kiang | G06F 21/6218 |
| 9,772,845 | B2 * | 9/2017 | Yap | H04L 9/0643 |
| 9,960,465 | B2 * | 5/2018 | Dudley | H01M 50/204 |
| 10,038,550 | B2 * | 7/2018 | Gopal | H04L 9/0625 |
| 10,057,058 | B2 * | 8/2018 | Murakami | H04L 9/0858 |
| 10,313,129 | B2 * | 6/2019 | Gopal | G06F 9/30007 |
| 2002/0040429 | A1 * | 4/2002 | Dowling | G06F 9/3814 712/228 |
| 2003/0084309 | A1 * | 5/2003 | Kohn | G06F 9/3879 713/189 |
| 2005/0138352 | A1 * | 6/2005 | Gauvreau | H04L 9/3247 713/153 |
| 2007/0065154 | A1 * | 3/2007 | Luo | H04J 14/0282 398/141 |
| 2007/0076884 | A1 * | 4/2007 | Wellbrock | H04L 9/0855 380/263 |
| 2007/0195774 | A1 * | 8/2007 | Sherman | H04L 69/16 370/392 |
| 2008/0019524 | A1 * | 1/2008 | Kim | H04L 9/0631 380/259 |
| 2008/0056488 | A1 * | 3/2008 | Motoyama | G06F 7/00 380/28 |
| 2008/0229116 | A1 * | 9/2008 | Dixon | H04L 9/0637 713/190 |
| 2008/0298583 | A1 * | 12/2008 | Ahmed | H04L 9/065 380/46 |
| 2009/0254718 | A1 | 10/2009 | Biscondi et al. | |
| 2010/0115237 | A1 * | 5/2010 | Brewer | G06F 9/30036 711/170 |
| 2010/0128872 | A1 * | 5/2010 | Cordery | H04L 9/3242 380/255 |
| 2010/0146296 | A1 * | 6/2010 | Kim | H04L 9/3239 713/189 |
| 2010/0195820 | A1 * | 8/2010 | Frank | H04L 9/0631 380/28 |
| 2010/0235417 | A1 * | 9/2010 | Baek | G06F 7/764 708/236 |
| 2010/0289943 | A1 * | 11/2010 | Tokoro | H04H 40/27 348/425.2 |
| 2011/0206204 | A1 * | 8/2011 | Sychev | H04J 14/06 380/256 |
| 2011/0213979 | A1 * | 9/2011 | Wiseman | H04L 9/0844 713/171 |
| 2012/0076293 | A1 * | 3/2012 | Smith | H04L 9/0656 380/28 |
| 2013/0275722 | A1 * | 10/2013 | Yap | H04L 9/0643 712/208 |
| 2014/0010234 | A1 * | 1/2014 | Patel | H04L 45/74 370/392 |
| 2014/0068765 | A1 * | 3/2014 | Choi | H04L 63/1416 726/23 |
| 2014/0095844 | A1 * | 4/2014 | Gopal | H04L 9/0643 712/223 |
| 2014/0133652 | A1 * | 5/2014 | Oshida | H04L 9/0897 380/255 |
| 2014/0189369 | A1 * | 7/2014 | Wolrich | G06F 21/64 713/192 |
| 2014/0254792 | A1 * | 9/2014 | Gammel | H04L 9/002 380/28 |
| 2015/0149788 | A1 * | 5/2015 | Gupta | G06F 12/1408 713/189 |
| 2016/0080143 | A1 * | 3/2016 | Kindarji | H04L 9/0618 380/28 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0018013 | A1 * | 1/2017 | Faust | G06Q 30/0283 |
| 2017/0109162 | A1 * | 4/2017 | Yap | H04L 9/0643 |
| 2017/0142081 | A1 * | 5/2017 | Jutla | H04L 63/061 |
| 2017/0180131 | A1 * | 6/2017 | Ghosh | G06F 21/75 |
| 2017/0214525 | A1 * | 7/2017 | Zhao | H04W 12/0431 |
| 2017/0230173 | A1 * | 8/2017 | Choi | H04L 9/0861 |
| 2017/0242590 | A1 * | 8/2017 | Gokhale | G06F 12/0223 |
| 2018/0063100 | A1 * | 3/2018 | Peeters | G06F 21/74 |
| 2018/0157489 | A1 | 6/2018 | Yap et al. | |
| 2018/0176091 | A1 * | 6/2018 | Yoon | H04L 5/1446 |
| 2018/0212761 | A1 * | 7/2018 | Bilgin | H04L 9/0861 |
| 2019/0036821 | A1 * | 1/2019 | Levy | G06F 12/0868 |
| 2019/0109703 | A1 * | 4/2019 | Gueron | G06F 9/30156 |
| 2019/0146700 | A1 * | 5/2019 | Gschwind | G06F 9/30043 711/170 |
| 2019/0349392 | A1 * | 11/2019 | Wetterwald | H04L 43/0852 |
| 2020/0084222 | A1 * | 3/2020 | William | H04L 63/12 |

FOREIGN PATENT DOCUMENTS

| | | |
|---|---|---|
| EP | 801477 A1 | 10/1997 |
| EP | 955590 A1 | 11/1999 |
| EP | 992887 A2 | 4/2000 |
| JP | H03251890 A | 11/1991 |
| JP | 20010195555 A | 7/2001 |
| JP | 2002107691 A | 4/2002 |
| JP | 20050532604 A | 10/2005 |
| JP | 2008233683 A | 10/2008 |
| JP | 2014197169 A | 10/2014 |
| JP | 2015014962 A | 1/2015 |
| JP | H10-31530 A | 2/2019 |
| JP | 20190511791 A | 4/2019 |
| KR | 1020190020988 A | 3/2019 |
| WO | 0176129 A2 | 10/2001 |
| WO | 03/021863 A1 | 3/2003 |
| WO | 2011123575 A1 | 10/2011 |
| WO | 2014/136594 A1 | 9/2014 |
| WO | 2019158641 A1 | 8/2019 |
| WO | 2021014125 A1 | 1/2021 |
| WO | 2021032946 A1 | 2/2021 |

OTHER PUBLICATIONS

Ascon A Family of Authenticated Encryption Algorithms, Jan. 2, 2019.

David J. Wheeler and Roger M. Needham. Correction to xtea. InformalManuscript or Report, 1998. URL: https://www.mjos.fi/doc/misc/xxtea.pdf. Oct. 1998.

(56) References Cited

OTHER PUBLICATIONS

"A cryptographic algorithm based on Linear Feedback Shift Register." 2010 International Conference on Computer Application and System Modeling (ICCASM 2010). vol. 15. IEEE, 2010. (Year: 2010).
"[FIPS 202] "SHA-3 Standard: Permutation-Based Hash and Extendable-Output Functions"National Institute of Standards and Technology (NIST), Aug. 2015 https://dx.doi.org/10.6028/NIST.FIPS.202".
"Rossi Mélissa: ""Extended Security of Lattice-Based Cryptography"", https://hal.archives-ouvertes.fr/tel-02946399/document" Sep. 10, 2020.
Japanese Office Action dated Jul. 1, 2024 for Japanese Patent Application No. 2022-503796.
"Blitter Hardware" of the AMIGA Hardware Reference Manual. Addison-Wesley. 1985, Chapter 6.
""Crypto-processeur"", pp. 1-190 URL: https://tel.archives-ouvertes.fr/tel-00978472/document sections 3 and 4, 2012.
[CC-PP-0084] "Security IC Platform Protection Profile with Augmentation Packages." Bundesamt für Sicherheit in der Informationstechnik (BSI) reference BSI-CC-PP-0084-2014.https://www.commoncriteriaportal.org/files/ppfiles/pp0084b_pdf.pdf Jan. 13, 2014.
[SOGIS-AVA] "Application of Attack Potential to Smartcards and Similar Devices." Version 3.1. (2020). https://www.sogis.eu/documents/cc/domains/sc/JIL-Application-of-Attack-Potential-to-Smartcards-v3-1.pdf Jun. 2020.
[SP800-193] "Platform Firmware Resiliency Guidelines." NIST SP 800-193. (2018). DOI: https://doi.org/10.6028/NIST.SP.800-193 May 2018.
[RFC8391] "XMSS: extended Merkle Signature Scheme." IETF RFC 8391 (2018). DOI: https://doi.org/10.17487/RFC8391 May 2018.
[RFC8554] "Leighton-Micali Hash-Based Signatures." IETF RFC 8554 (2018). DOI: https://doi.org/10.17487/RFC8554, Apr. 2018.
[FIPS202] "SHA-3 Standard: Permutation-Based Hash and Extendable-Output Functions." FIPS PUB 202. (2015). DOI: https://doi.org/10.6028/NIST.FIPS.202 Aug. 2015.
[PQFAQ] ""Post-Quantum Cryptography FAQs / Transition and Migration.""https://csrc.nist.gov/projects/post-quantum-cryptography/faqs Jan. 3, 2017.
[CoGrVa14] J. Coron, J. Großschädl, P. K. Vadnala. ""Secure Conversion Between Boolean and Arithmetic Masking of Any Order.""IACR-CHES (2014). http://www.crypto-uni.lu/jscoron/publications/secconvorder.pdf Sep. 23, 2014.
[Co17] J. Coron. "High-Order Conversion From Boolean to Arithmetic Masking." IACR-CHES (2017). https://eprint.iacr.org/2017/252 Sep. 25, 2017.
[GaGrMa+20] S. Gao, J. Großschadl, B. Marshall, D. Page, T. Pham, and F. Regazzoni. "An Instruction Set Extension to Support Software-Based Masking."(2020) https://eprint.iacr.org/2020/773 Jun. 23, 2020.
[BeDaPe+10] G. Bertoni, J. Daemen, M. Peeters, and G. Van Assche. ""Building power analysis resistant implementations of Keccak.""SHA-3 Conference (2010) https://keccak.team/files/KeccakDPA.pdf Aug. 2010.
[NiRiSc11] S. Nikova, V. Rijmen, and M. Schlaffer. ""Secure Hardware Implementation of Nonlinear Functions in the Presence of Glitches.""J. Cryptol. 24, pp. 292-322 (2011). https://doi.org/10.1007/s00145-010-9085-7 Oct. 19, 2010.
[Sa18] M.-J. O. Saarinen. "Arithmetic Coding and Blinding Countermeasures for Lattice Signatures." J. Cryptogr. Eng. (2018) 8:71-84. http://rdcu.be/oHun https://eprint.iacr.org/2016/276 Jan. 21, 2017.
[BaBeEs+18] G. Barthe, S. Belaïd, T. Espitau, P.-A. Fouque, B. Grégoire, M. Rossi, and M. Tibouchi. "Masking the GLP Lattice-Based Signature Scheme at Any Order."IACR-EUROCRYPT (2018) https://eprint.iacr.org/2018/381 Apr. 26, 2018.
[BeAnKa+20] M. Van Beirendonck, J. D'Anvers, A. Karmakar, J. Balasch, and I. Verbauwhede."A Side-Channel Resistant Implementation of SABER." To appear in ACM JETC (2020). https://eprint.iacr.org/2020/733 Jun. 17, 2020.

[BoGoRe+21] J. Bos, M. Gourjon, J. Renes, T. Schneider, and C. van Vredendaal. "Masking Kyber: First- and Higher-Order Implementations."To appear (2021). https://eprint.iacr.org/2021/483 Apr. 15, 2021.
[FrVaRo+21] T. Fritzmann, M. Van Beirendonck, D. Basu Roy, P. Karl, T. Schamberger, I. Verbauwhede, and G. Sigl. "Masked Accelerators and Instruction Set Extensions for Post-Quantum Cryptography."Preprint (2021). https://eprint.iacr.org/2021/479 Apr. 15, 2021.
[MiGeTi+19] V. Migliore, B. Gérard, M. Tibouchi, and P. Fouque. "Masking Dilithium: Efficient Implementation and Side-Channel Evaluation."ACNS (2019). https://eprint.iacr.org/2019/394 Apr. 14, 2019.
[RV-ISA] RISC-V International. "RISC-V Specifications." RISC-V International (2021). https://riscv.org/technical/specifications/.
[RV-CRYPTO] RISC-V International (Ben Marshall, Ed.) "RISC-V Cryptography Extension." RISC-V CETG (2021). https://github.com/riscv/riscv-crypto Feb. 19, 2020.
[RV-ZKT] RISC-V International (M.-J. Saarinen, Ed.) "Zkt Constant Time Instruction List." RISC-V CETG (2021). https://github.com/rvkrypto/riscv-zkt-list Apr. 9, 2021.
[RV-VECTOR] "Working draft of the proposed Risc-V V vector extension."RISC-V (2021). https://github.com/riscv/riscv-v-spec Jun. 13, 2019.
[SP 800-185] "SHA-3 Derived Functions: cSHAKE, KMAC, TupleHash, and ParallelHash"National Institute of Standards and Technology (NIST), Dec. 2016 https://doi.org/10.6028/NIST.SP.800-185 John Kelsey, Shu-Jen Chang, Ray Perlner.
[NIST PQC] "Post-Quantum Cryptography: Round 2 Submissions" Jan. 3, 2017 https://csrc.nist.gov/Projects/Post-Quantum-Cryptography/Round-2-Submissions.
[NIST LWC] "Lightweight Cryptography: Round 1 Candidates" created Jan. 3, 2017 https://csrc.nist.gov/Projects/Lightweight-Cryptography/Round-1-Candidates.
[Ascon] Christoph Dobraunig, Maria Eichlseder, Florian Mendel and Martin Schläffer, ""Asconv1.2."" Proposal to NIST LWC standardization effort, Mar. 2019. https://ascon.iaik.tugraz.at/files/asconv12-nist.pdf https://ascon.iaik.tugraz.at/.
[Farfalle] Guido Bertoni, Joan Daemen, Seth Hoffert, Michael Peeters, Gilles Van Assche, and Ronny Van Keer, "Farfalle: parallel permutation-based cryptography." IACR Cryptology ePrintArchive: Report 2016/1188, Dec. 2016. https://eprint.iacr.org/2016/1188.
[Kangaroo] Guido Bertoni, Joan Daemen, Michaël Peeters, Gilles Van Assche, Ronny Van Keer, and Benoît Viguier, "KangarooTwelve: fast hashing based on Keccak-p." Proc. ACNS 2018, LNCS 10892, pp. 400-418, Springer, 2018. https://doi.org/10.1007/978-3-319-93387-0_21https://keccak.team/files/KangarooTwelve.pdf.
[Keyak] Guido Bertoni, Joan Daemen, Seth Hoffert, Michaël Peeters, Gilles Van Assche, andRonny Van Keer, "Caesar submission: Keyak v2." Keccak Team, Sep. 2016.https://keccak.team/keyak.html https://keccak.team/files/Keyakv2-doc2.2.pdf.
[RISCV] Andrew Waterman and Krste Asanović (Eds.), "The RISC-V Instruction Set Manual(vols. 1 and 2)." RISC-V Foundation, Jun. 2019. https://riscv.org/specifications/.
[Sneik] Markku-Juhani O. Saarinen, "Sneiken and Sneikha: The Sneik Family ofLightweight Cryptographic Algorithms." Proposal to NIST LWC standardization effort, Mar. 2019. https://github.com/pqshield/sneik.
Hayo Baan, Sauvik Bhattacharya, Scott Fluhrer, Oscar Garcia-Morchon, ThijsLaarhoven, Ronald Rietman, Markku-Juhani O. Saarinen, Ludo Tolhuizen, and Zhenfei Zhang. Round5: Compact and fast post-quantum public-keyencryption. In PQCrypto 2019— The Tenth International Conference on Post-Quantum Cryptography. Chongqing, China, May 8-10, 2019, volume to appearof Lecture Notes in Computer Science. Springer, 2019. URL: https://eprint.iacr.org/2019/090.
Daniel J. Bernstein. Chacha, a variant of salsa20, 2008. URL: https://cr.yp.to/chacha/chacha-20080128.pdf. Jan. 28, 2008.
Joppe W. Bos, Simon Friedberger, Marco Martinoli, Elisabeth Oswald, andMartijn Stam. Fly, you fool! faster frodo for the Arm cortex-m4. IACRCryptology ePrint Archive, 2018:1116, 2018. URL: https://eprint.iacr.org/2018/1116. Nov. 16, 2018.

(56) References Cited

OTHER PUBLICATIONS

Daniel J. Bernstein et al.: A cross-platformpermutation. In Wieland Fischer and Naofumi Homma, editors, Crypto-graphic Hardware and Embedded Systems—CHES 2017—19th InternationalConference, Taipei, Taiwan, Sep. 25-28, 2017, Proceedings, vol. 10529 of Lecture Notes in Computer Science, pp. 299-320. Springer, 2017. doi:10.1007/978-3-319-66787-4\_15. Sep. 25, 2017.

Ray Beaulieu, Douglas Shors, Jason Smith, Stefan Treatman-Clark, BryanWeeks, and Louis Wingers. The Simon and Speck families of lightweightblock ciphers. IACR Cryptology ePrint Archive, 2013:404, 2013. URL: https://eprint.iacr.org/2013/404. Jun. 19, 2013.

Christoph Dobraunig, Maria Eichlseder, Florian Mendel, and Martin Schlaffer.Ascon v1.2. Submission to the Caesar Competition, 2016. URL: https://competitions.cr.yp.to/round3/asconv12.pdf. Sep. 15, 2016.

Joan Daemen, Seth Hoffert, Gilles Van Assche, and Ronny Van Keer. Thedesign of xoodoo and xoofff. IACR Trans. Symmetric Cryptol., 2018(4):1-38, 2018. URL: https://doi.org/10.13154/tosc.v2018.i4.1-38, doi:10.13154/tosc.v2018.i4.1-38. Dec. 13, 2018.

Peter Gazi et al. The exact PRF securityof truncation: Tight bounds for keyed sponges and truncated CBC. In Rosario Gennaro and Matthew Robshaw, editors, Advances in Cryptology—Crypto2015—35th Annual Cryptology Conference, Santa Barbara, CA, USA, Aug. 16-20, 2015, Proceedings, Part I, vol. 9215 of Lecture Notes in ComputerScience, pp. 368-387. Springer, 2015. doi:10.1007/978-3-662-47989-6\_18. Aug. 16, 2015.

Mike Hamburg. The Strobe protocol framework. IACR Cryptology ePrintArchive, 2017:3, 2017. URL: http://eprint.iacr.org/2017/003. Jan. 3, 2017.

Philipp Jovanovic et al. Beyond 2 c/2 security insponge-based authenticated encryption modes. In Palash Sarkar and Tetsulwata, editors, Advances in Cryptology—Asiacrypt 2014—20th International Conference on the Theory and Application of Cryptology and Informa-tion Security, Kaoshiung, Taiwan, R.O.C., Dec. 7-11, 2014. Proceedings, Part I, vol. 8873 of Lecture Notes in Computer Science, pp. 85-104. Springer, 2014. doi:10.1007/978-3-662-45611-8\_5.

Dmitry Khovratovich and Ivica Nikolic. Rotational cryptanalysis of ARX. InSeokhie Hong and Tetsu Iwata, editors, Fast Software Encryption, 17th In-ternational Workshop, FSE 2010, Seoul, Korea, Feb. 7-10, 2010, RevisedSelected Papers, vol. 6147 of Lecture Notes in Computer Science, pp. 333-346. Springer, 2010. URL: https://doi.org/10.1007/978-3-642-13858-4_19, doi:10.1007/978-3-642-13858-4\_19.

Kathleen M. Moriarty, Burt Kaliski, Jakob Jonsson, and Andreas Rusch. PKCS #1: RSA cryptography specifications version 2.2. RFC, 8017:1-78,2016. doi:10.17487/RFC8017. Nov. 2016.

Bart Mennink, Reza Reyhanitabar, and Damian Vizár. Security of full-statekeyed sponge and duplex: Applications to authenticated encryption. In Tetsulwata and Jung Hee Cheon, editors, Advances in Cryptology—Asiacrypt2015—21st International Conference on the Theory and Application of Cryptol-ogy and Information Security, Auckland, New Zealand, Nov. 29-Dec. 3, 2015, Proceedings, Part II, vol. 9453 of Lecture Notes in ComputerScience, pp. 465-489. Springer, 2015. doi:10.1007/978-3-662-48800-3\_19.

B. Poettering. Avraes: The aes block cipher on avr controllers, 2007. URL:http://point-at-infinity.org/avraes/. Mar. 11, 2007.

Markku-Juhani O. Saarinen. Beyond modes: Building a secure record protocolfrom a cryptographic sponge permutation. In Benaloh [Ben14], pp. 270-285.doi: 10.1007/978-3-319-04852-9\_14. Feb. 25, 2014.

Markku-Juhani O. Saarinen. CBEAM: efficient authenticated encryption fromfeebly one-way φ functions. In Benaloh [Ben14], pp. 251-269. doi: 10.1007/978-3-319-04852-9\_13. Nov. 21, 2013.

Markku-Juhani O. Saarinen and Billy Bob Brumley. Whirlbob, the whirlpoolbased variant of STRIBOB. In Sonja Buchegger and Mads Dam, editors, Se-cure IT Systems, 20th Nordic Conference, NordSec 2015, Stockholm, Sweden, Oct. 19-21, 2015, Proceedings, vol. 9417 of Lecture Notes in ComputerScience, pp. 106-122. Springer, 2015. doi:10.1007/978-3-319-26502-5\_8.

Notice of Allowance dated Aug. 5, 2025 for Chinese Patent Application No. 2020800583418.

* cited by examiner

CRYPTOGRAPHIC SYSTEM FOR POST-QUANTUM CRYPTOGRAPHIC OPERATIONS

CROSS-REFERENCE TO RELATED APPLICATIONS

This application is a continuation under 35 U.S.C. § 120 of International Application No. PCT/GB2022/051829, filed Jul. 14, 2022, which claims priority to UK Application No. GB2110207.4, filed Jul. 15, 2021, under 35 U.S.C. § 119(a). Each of the above-referenced patent applications is incorporated by reference in its entirety.

BACKGROUND

Technical Field

The present invention relates to cryptographic hardware, in particular, a cryptographic system for performing cryptographic operations. The cryptographic system may be used as part of a post-quantum cryptographic system on chip. The cryptographic system may be used to perform cryptographic computations for a communicatively-coupled computing system, e.g. operate as a cryptographic module for a computing board. Methods of operating a cryptographic system are also described. In particular, methods and systems relating to masking and side-channel security are provided.

Background

Recently, there has been an explosion in the number of devices that are connected to computer networks. For example, Internet connectivity is expanding beyond computing devices such as desktop and laptop computers to embedded systems within everyday objects such as motor vehicles, lightbulbs, fridges, medical devices, thermostats, and surveillance systems. Telecommunications links allow many low-cost computing devices to report sensor data, and/or be controlled, across the world. One issue with these connected devices is that they are often vulnerable to attack and malicious control. For example, hundreds or thousands of embedded devices may be compromised by malicious parties and used to enact distributed denial of services attacks. In many cases, control of these devices is easily obtained due to poor or limited implementations of cryptographic protocols. As these connected devices grow in number and popularity, there is an open question as to how to secure them.

Another consideration when securing connected computing devices is the possibility of a future attack using quantum computing. For many years, quantum computers were of mainly theoretical interest. However, research implementations of quantum computers are developing rapidly. Quantum computers having 50 and 72 qubits are currently available, and there are many research groups actively working on higher qubit machines. Given the possible future reality of quantum computing, recent work has shown that many well-known public key cryptographic systems can be broken by a sufficiently strong quantum computer.

When implementing cryptographic functions, especially those that are "post quantum" secure, there is the challenge that many of these functions are resource intensive. For example, many cryptographic functions involve complex mathematical functions using values with long bit lengths. These typically consume a large number of processor cycles and present difficulties for implementations within low-resource embedded devices. Additionally, as end-to-end encryption of both data and communications becomes common, these cryptographic functions also have to be performed repeatedly at high speeds. To be secure is to be slow.

WO 2021/032946 A1, which is incorporated herein by reference, describes a co-processor that allows a processing unit to efficiently perform a cryptographic operation. The co-processor has an arithmetic unit that is configured to perform discrete binary arithmetic using bit sequences loaded from a memory. The co-processor may be configured for fast, low-power computation of certain functions that comprise low-level building blocks for the cryptographic operation. These functions may include Boolean logic and integer arithmetic. The co-processor has a set of control registers that are writable by the processing unit to control the co-processor. Addresses for one or more sources and destinations may be computed by the co-processor to allow for flexible operation. The co-processor may allow many advanced cryptographic operations to be rapidly computed, including those that are "post-quantum" secure.

The cryptographic co-processor described in WO 2021/032946 A1 may be protected using security fuses and/or side-channel attack countermeasures. However, WO 2021/032946 A1 does not describe in detail how these may be implemented and/or integrated within flexible cryptographic processing circuitry.

US 2010/115237 A1, which is incorporated herein by reference, describes a co-processor that comprises one or more application engines that can be dynamically configured to a desired personality. For instance, the application engines may be dynamically configured to any of a plurality of different vector processing instruction sets, such as a single-precision vector processing instruction set and a double-precision vector processing instruction set. The co-processor further comprises a common infrastructure that is common across the different personalities, such as an instruction decode infrastructure, memory management infrastructure, system interface infrastructure, and/or scalar processing unit (that has a base set of instructions). Thus, the personality of the co-processor can be dynamically modified (by reconfiguring one or more application engines of the co-processor), while the common infrastructure of the co-processor remains consistent across the various personalities. Although US 2010/115237 A1 describes how a pre-defined instruction set may be designed for processing cryptography-related operations, it is silent on specific adaptations for secure post-quantum cryptography.

WO 2014/136594 A1, which is incorporated herein by reference, describes a hash value generating device for generating a hash value based on the KECCAK algorithm. The device includes a θ processing unit, a ρ processing unit, a π processing unit, a χ processing unit, and an ι processing unit for performing processing of five steps θ, ρ, π, χ, and ι, included in round processing of the KECCAK algorithm. The π processing unit receives input of data in units of planes and outputs data in units of sheets. WO 2014/136594 A1 describes a specialised device for the processing of the KECCAK algorithm and so is limited in relevance for broader post-quantum cryptographic operations.

Mélissa Rossi, in her doctorate PHD thesis "Extended Security of Lattice-Based Cryptography", submitted to the HAL archive on 23 Sep. 2020, analyses the real-world security of lattice-based post-quantum asymmetric schemes. In part I, algorithmic protections against timing and side-channel attacks are analysed, concentrating on signature schemes. The focus is on introducing algorithmic tools to tackle these attacks. The thesis seeks to fill some of the gaps in proving timing protection and high-order masking in lattice-based post-quantum asymmetric schemes (see section 1.3). Part II of the thesis then concentrates on cryptoanalysis. Chapter 3 looks in more detail at masking lattice-based signatures. Rossi states that masking lattice-based signature schemes is particularly challenging, even for simple schemes (see page 62). In section 3.1, Rossi states that implementation of lattice-based primitives poses new sets of challenges as far as side-channel and other physical attacks are concerned. While masking has been used in prequantum cryptography, its application to post-quantum cryptography is not straightforward, and Rossi examines several theoretic models before introducing a number of high-level pseudo-code "gadgets" that represent sub-parts of larger algorithms (see page 67). Several proof-of-concept implementations of masked signature schemes are tested on Intel® Core® i7 CPU-based desktop machines (see section 3.3.5 of page 89 and 3.5.4 of page 101). A simple implementation of the qTESLA scheme with masking of order 1 is also tested on a Cortex® M4 microcontroller.

US 2010/0235417A1 describes a circuit for converting Boolean and arithmetic masks.

It is desirable to provide efficient implementations of cryptographic operations. For example, it is desired to provide implementations that may be used within low-resource embedded systems and/or in high-speed data processing operations, while offering resistance to attack in a post-quantum environment. For example, it is desired to easily provide secure post-quantum cryptographic services to different computing systems without needing large-scale redesign of those computing systems.

When implementing masking with lattice-based cryptography, there is the additional challenge of providing efficient yet secure low-level implementations. For example, the pseudo-code gadgets provided by Rossi have a conventional CPU implementation (e.g., via execution of computer program code implementing the pseudo-code). Such an implementation is vulnerable to attack as sensitive data such as portions of the private key still need to be loaded from memory into the CPU prior to and during the masking operation. Given the complexity of modern CPUs, e.g. with multiple caches and opaque processing pipelines, this can offer malicious parties numerous points of interception and/or measurement, despite masking being applied.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings, in which.

DETAILED DESCRIPTION

Introduction

Figure 1:
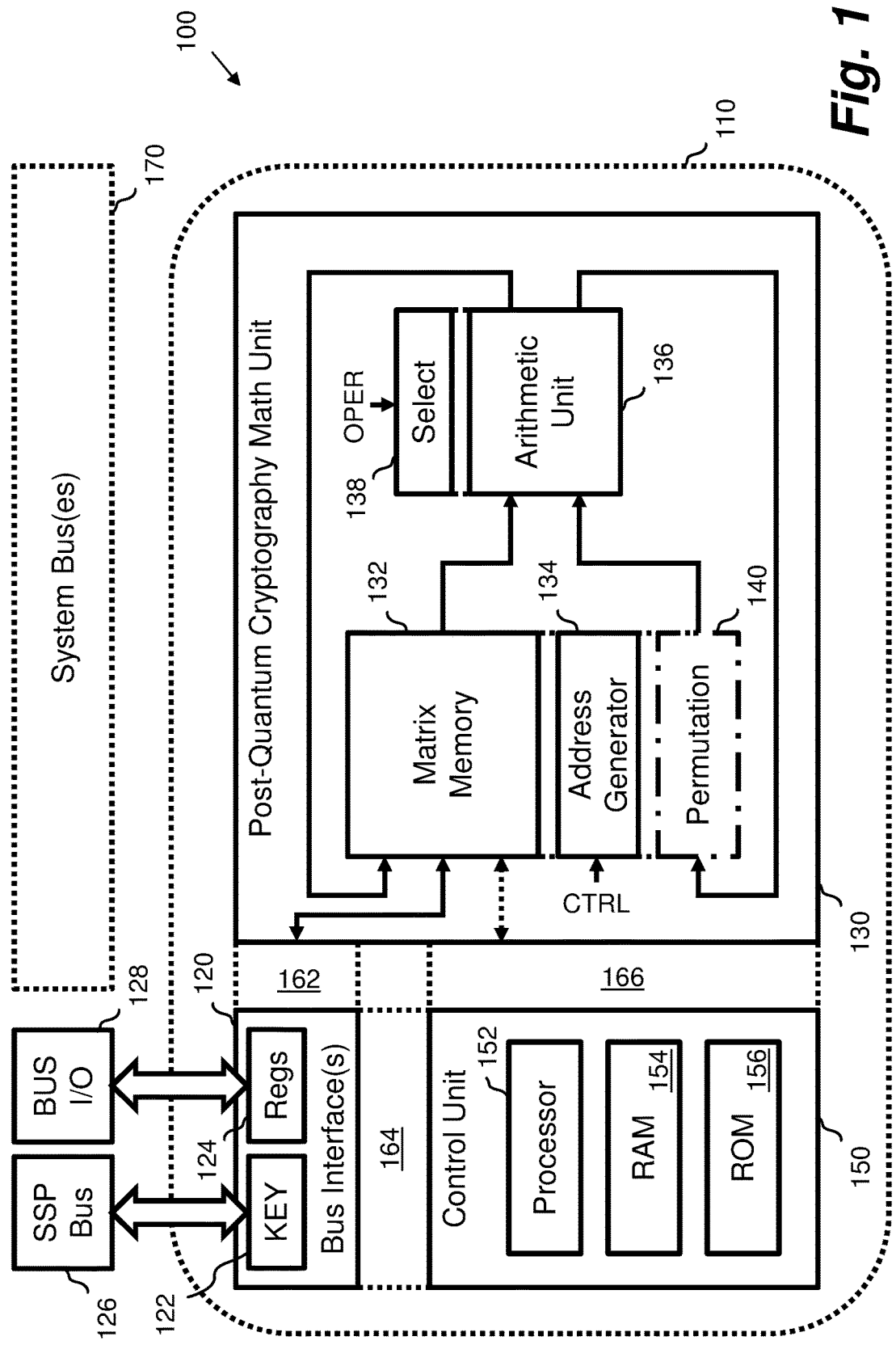
FIG. 1 is a schematic illustration showing a cryptographic system according to an example.

Certain examples described herein relate to a cryptographic system that allows a communicatively-coupled computing system to efficiently perform a cryptographic operation. For example, the cryptographic system may be provided as a system-on-chip device for inclusion into a larger computing circuit board and/or integrated circuit. The cryptographic system may be implemented in silicon, i.e. as an integrated circuit design that is fabricated alone (e.g., as an Application Specific Integrated Circuit-ASIC) or together with a larger computing system circuit, and/or as an Field Programmable Gate Array (FPGA), e.g. in the form of a specific configuration of the FPGA that is programmed in a suitable hardware description language. The cryptographic system may be used as a "post-quantum" cryptographic module or co-processor, e.g. allowing one or more processors of the communicatively-coupled computing system to off-load complex "post-quantum" cryptographic operations for quick, secure computation. For example, the cryptographic system may be configured to implement key establishment and digital signature functions on behalf of the computing system. The cryptographic system may be arranged with a security boundary such that other devices and integrated circuits of the computing system, and in certain cases even the computing system itself, do not have access to secret data that is manipulated within the cryptographic system. The cryptographic system may be configured to autonomously execute post-quantum cryptographic operations as part of a larger hardware system, such as a larger ASIC or FPGA design.

In certain described examples, the cryptographic system comprises a set of bus interfaces for communicatively coupling the cryptographic system to one or more system buses of the computing system; a cryptographic math unit; and a control unit comprising at least one processor and memory to control the cryptographic system. These components allow the cryptographic system to operate as an autonomous system within wider electronic hardware. The cryptographic math unit may comprise a matrix memory to store data configured as a multi-dimensional array; an address generator configured to receive control signals from the control unit and to control access to data within the matrix memory; and an arithmetic unit to perform a set of defined arithmetic operations upon data within the matrix memory as accessed using the address generator. The arithmetic unit may be configured to perform discrete binary arithmetic using bit sequences loaded from the matrix memory. These bit-sequences may be blocks of bits and so the cryptographic math unit may implement "blitter" functionality, i.e. a hardware-assisted system for movement and manipulation of blocks of bits in memory (where the term "blitter" comes from the "BitBLT"-bit block transfer-microcode instruction of the Xerox Alto computer). The cryptographic system may be configured for fast, low-power computation of certain functions that comprise low-level building blocks for the cryptographic operation. These functions may include Boolean logic, integer arithmetic and vector processing, as well as permutation cryptography. As such, a processing unit of the coupled computing system may effectively off-load resource intensive computations for the cryptographic operation to the cryptographic system, which operates as a dedicated and secure hardware device. The cryptographic system may provide low-level bit operations that are atomic from the viewpoint of the coupled computing system. The cryptographic system may thus allow many advanced cryptographic operations to be rapidly computed, including those that are "post-quantum" secure.

The term "post-quantum" is used herein to describe cryptographic operations and functions that provide protection against attack by a quantum computer. It is a well-known term within the field of cryptography. For example, many popular public-key algorithms are not post-quantum secure, they can be efficiently broken using a sufficiently strong quantum computer. These "quantum insecure" cryptographic algorithms include those based on the integer factorisation problem, the discrete logarithm problem or the elliptic-curve discrete logarithm problem; these may all be easily solved on a sufficiently powerful quantum computer using Shor's algorithm. Operations and functions that have been demonstrated to be post-quantum secure include those based on one or more of: lattice-based cryptography; multivariate cryptography; hash-based cryptography; code-based cryptography; and supersingular elliptic curve isogeny cryptography. Examples of specific post-quantum operations and functions that may be implemented by the cryptographic system described herein are set out in more detail below.

The cryptographic system of the examples is suitable for use in a wide variety of computing systems, from Internet servers to embedded devices. In one implementation, the cryptographic system may be provided as part of a cryptographic system-on-chip (SoC) that may allow for many low-cost embedded devices to implement "post-quantum" cryptography and provide "post-quantum" secure systems. For example, the functions implemented by the cryptographic math unit may allow code or lattice-based cryptographic operations to be rapidly performed, e.g. by off-loading many common low-level binary logic functions such as integer addition, subtraction and/or multiplication. The cryptographic system may be configured or pre-programmed with a set of available functions that may be updatable over time. The cryptographic system may rapidly compute certain functions by avoiding the need to load and interpret distinct instructions as required by a processor of the coupled computing system. The cryptographic system may be considered as a specialised computing device (i.e., a computer) that is designed for integration with larger general-purpose computing devices (e.g., for use as a computer within a computer).

Example Cryptographic System

FIG. 1 shows an example 100 of a cryptographic system 110. The cryptographic system 110 comprises a set of bus interfaces 120, a cryptographic math unit 130 and a control unit 150. The set of bus interfaces 120 are arranged to communicatively couple the cryptographic system 110 to one or more system buses of a computing system. As described above, the computing system may comprise a computing device (such as a server board) or an integrated circuit (such as a larger FPGA and/or ASIC embedded system). In one case, the cryptographic system 110 may be implemented as a system-on-chip (SoC) that is coupled to a motherboard (or other set of electronic circuit boards) of a computing device. The set of bus interfaces 120 allow control instructions and/or secret data to be received from the computing system (e.g., from a processor and/or memory of the computing system, or from one or more peripherals). In one case, a processor of the computing system may instruct the cryptographic system to perform cryptographic operations that involve the reading and/or writing of data via the set of bus interfaces. The cryptographic math unit 130 comprises a number of components to perform mathematical operations for post-quantum cryptographic operations and functions. The cryptographic math unit 130 may receive data from, and/or return processed data to, the set of bus interfaces 120. The cryptographic math unit 130 operates under the control of the control unit 150. The control unit 150 comprises at least one processor and memory to control the cryptographic system. The cryptographic system 110 may be embedded into a range of devices, from smart cards to server boards, or may form part of a mother- or circuit-board for a computing device, such as a server, laptop, tablet or smartphone.

In more detail, the set of bus interfaces 120 in the example of FIG. 1 comprise a set of cryptographic registers 122 and a set of control registers 124, where "set" is used here to refer to one or more registers. The set of cryptographic registers 122 are configured for the transfer of sensitive security parameters (SSPs) to and from the cryptographic system 110. The sensitive security parameters may comprise secret key material and/or data from a random number generator (e.g., such as a true random number generator—TRNG—feed). The sensitive security parameters may be encrypted for transfer. The set of cryptographic registers 122 are shown as a KEY interface in FIG. 1 as they may be used as a dedicated cryptographic key management interface to transfer data. The set of cryptographic registers 122 may be used to transfer data between the cryptographic system 110 and secure non-volatile storage of the computing system and/or other cryptographic units of the computing system (such as a Trusted Platform Module—TPM—of the computing system). The set of cryptographic registers 122 are shown communicatively coupled to a SSP bus 126 for the transfer of secure data. The SSP bus 126 may comprise one or more dedicated secure buses of the computing system for the transfer of cryptographic data and/or a suitably secured generic system bus (e.g., reserved-access channels for a general system bus). The set of control registers 124 allow high-level control interactions with the cryptographic system 110. In use, the dotted boundary of the cryptographic system 110 shown in FIG. 1 forms a security boundary such that the computing system may be restricted from accessing components and data within the security boundary. For example, secret data may only be exchanged via the set of cryptographic registers 122 communicating with the SSP bus 126, and the computing system may only communicate with the cryptographic system by way of a predefined set of control instructions that are writable by at least one processor of the communicatively-coupled computing system to the set of control registers 124. For example, the set of control registers 124 and one or more computing system buses 128 may form an Advanced extensible Interface (AXI) and/or an Advanced High-performance Bus (AHB) interface to enable chip-to-chip communication between the (external) computing system and the cryptographic system 110. For example, at least one processor of the computing system (or an authorised peripheral) may instruct cryptographic operations using AXI and/or AHB commands. In general, any bus architecture may be used, including any advanced microcontroller bus architecture. In certain cases, the set of cryptographic registers 122 and the set of control registers 124 may form separate AXI and/or AHB interfaces, e.g. in the form of a first memory interface for read and/or writes and a second control interface for control parameters.

In use, the control unit 150 controls operation of the cryptographic math unit 130 to perform cryptographic operations (e.g., the processing of data received via the set of cryptographic registers 122) following high-level instructions received from the computing system (e.g., from a processor or authorised peripheral via the set of control registers 124). The cryptographic system 110 is configured to implement at least post-quantum cryptographic operations. In certain implementations, the cryptographic system 110 may also perform non-quantum (e.g., classical) cryptographic operations. The control unit 150 and the cryptographic math unit 130 may be optimised for lattice- and code-based cryptography (amongst other post-quantum approaches), as well as "big integer" arithmetic (e.g., arithmetic with large integer values as defined by n-bits where n may be 32 or 64). The set of control registers 124 may be used to store one or more of: status (e.g., busy or awaiting instruction), a function to perform, sizes for source and/or destination data, memory locations for source and/or destination data, shift parameters, increment parameters for one or more of address and data arrays, and/or indicators to show whether a current function is complete. The (external) computing system may be configured to read a value stored within the set of control registers 124 to determine whether an output of a function is available, may receive an interrupt from the cryptographic system 110 and/or may wait a predetermined number of clock cycles associated with a function. Different approaches may be used depending on implementation requirements.

In one case, the cryptographic system 110 is configured to perform one or more of: key establishment functions including one or more of encryption and decryption; digital signature functions including one or more of digital signature generation and digital signature verification; and stateful hash-based signatures. The cryptographic system 110 may be configured to perform these functions autonomously. For example, a processor of the computing system may instruct a cryptographic function to be performed on data within secure memory of the computing device via data written to the set of control registers 124 (e.g., by writing an instruction to said registers). The cryptographic system 110 may then be configured to access data copied into the set of cryptographic registers 122 and to perform the instructed cryptographic function using the control unit 150 and the cryptographic math unit 130, before arranging for any result of the function to be copied back to secure memory via the set of cryptographic registers 122. In this manner, a driver component for the cryptographic system 110 may be relatively simple; it may be primarily concerned with the scheduling of operations such that the computing system can arrange for input data to be available and wait for access to the result of the operations performed by the cryptographic system 110. While not executing a cryptographic operation, the cryptographic system 110 may be configured to enter a "sleep" mode with minimal dynamic power consumption.

The operations performed by the control unit 150 may be hardwired (e.g., as part of integrated circuit design) or updatable (e.g., via updatable firmware instructions). The operations may be selected from a set of available operations, where the set of available operations may be pre-configured (e.g., pre-programmed into, or configured within, an ASIC or FPGA, and/or in certain cases extendible or modifiable, e.g. via computer program code stored in memory). Parameters for the operations may be configured and/or selected using suitable hardware abstraction layer (HAL) functions, e.g. as accessible to an operating system or other processes via the aforementioned driver component.

In the example 100 of FIG. 1, the control unit 150 comprises a processor 152, random-access memory (RAM) 154 and read-alone memory (ROM) 156. The processor 152 may comprise a Reduced Instruction Set Computer (RISC) processor such as a RISC-V central processing unit (CPU). The processor 152 may comprise a 32- or 64-bit microprocessor (e.g., such as an RV32-I/E-/M/C Pluto core). The processor 152 may comprise one or more processing cores. The RAM 154 may comprise stack RAM for the control unit 150, i.e. memory for implementing a stack so as to manage control instructions sent to the cryptographic math unit 130. The RAM 154 and/or the ROM 156 may be used for storing firmware instructions for execution by the processor 152. The RAM 154 may comprise a volatile memory and the ROM 156 may comprise a non-volatile memory for control instructions. The ROM 156 may comprise a programmable ROM that stores firmware instructions and that allows firmware updates (e.g., via the set of bus interfaces 120).

In use, the control unit 150 does not have access to cryptographic data received via the set of cryptographic registers 122 nor does it have access to cryptographic data as it is processed by the cryptographic math unit 130. As shown in FIG. 1, the set of bus interfaces 120 may be communicatively coupled to the cryptographic math unit 130 by a first internal bus 162 and to the control unit 150 by a second internal bus 164. The first internal bus 162 may be secured and is used for transferring cryptographic data to and from the set of cryptographic registers 122. The second internal bus 164 is used by the control unit 150 to access control instructions written to the set of control registers 124. The control unit 150 then controls operation of the cryptographic math unit 130 via a third internal bus 166. The third internal bus 166 may comprise a so-called "no touch" control bus that does not allow access to the internal cryptographic data of the cryptographic math unit 130, e.g. it may only be used for the control of the cryptographic math unit 130 and data access may be disabled. Similarly, the control unit 150 may not be able to access data within the cryptographic registers 122. The control unit 150 interprets post-quantum computing commands received via the set of bus interfaces 120 and the first internal bus 164 and directs the operation of the cryptographic math unit 130 via the third internal bus 166 without touching cryptographic data.

In the example 100 of FIG. 1, the cryptographic math unit 130 comprises a matrix memory 132, an address generator 134, and an arithmetic unit 136. The matrix memory 132 is configured to store a multi-dimensional array of data, i.e. data arranged as a multi-dimensional array. Although the memory 132 is referred to as a "matrix memory" in terms of hardware it may be implemented using Random Access Memory (RAM) that is configured to be accessed via address generator 134 in a manner that allows for the storage of multi-dimensional arrays. The address generator 134 is configured to receive control signals (shown as "CTRL" in FIG. 1) from the control unit 150 and to control access to data within the matrix memory 132. The arithmetic unit 136 is configured to perform a set of defined arithmetic operations upon data within the matrix memory 132 as accessed using the address generator 134. The cryptographic math unit 130 may be referred to as a "blitter" as discussed above. In use, the cryptographic math unit 130 may be controlled to modify thousands of integer elements that are stored in the matrix memory 132. These integer elements may be defined as n-bit values (e.g., where n is commonly 16 or 32). The matrix memory 132 may be configured to allow efficient cryptographic operations upon a multi-dimensional representation of data, and to save a result of the operations as a similar multi-dimensional representation. For example, the matrix memory 132 may allow data to be stored and/or accessed as a two-dimensional array or matrix with a defined height and width. One example matrix memory is described in WO 2021/032946 A1. In one case, the matrix memory 132 may comprise memory (such as RAM) where data is stored as a flattened sequence of words yet where an external interface for operations within the cryptographic math unit 130 is provided that represents the data as a multi-dimensional data structure. The matrix memory 132 may (internally) convert from an array-based representation of data to the flattened sequence by iterating within a series of nested loops. In certain cases, access of the data as a matrix may be performed via the address generator 134.

For example, the matrix memory 132 may comprise RAM with n-bit internally addressable memory, where n may be configurable and include 16, 32, 64, 96, 128, and 256 bits (amongst others). In certain test implementations, 32-bit or 64-bit memories were used. The matrix memory 132 may represent data as a two-dimensional block of words (each word being n-bits) with a width and a height (e.g., as measured by a number of words in a first- or X-dimension and a number of words in a second- or Y-dimension). The size of each of the dimensions of the multi-dimensional array may be set by values set by the control unit 150, e.g. the control unit 150 may configure a matrix "width" as an integer size in words in a first dimension and matrix "height" as a second integer size in words in a second dimension. The size of each of the dimensions may be set as an integer value of 1 or more.

Data may be retrieved from the matrix memory 132 by iterating over a sequence of words stored in memory (e.g. RAM) using a set of nested loops, the number of nested loops being equal to the number of dimensions of the multi-dimensional array. For example, two nested loops may be used to iterate over a sequence of words in memory that are processed as a two-dimensional matrix.

As an example, consider the sequence "ABCDEFGHIJKLMNOP", where each letter represents a word stored in memory. This may be stored in the matrix memory 132 as a configurable matrix with 4 rows of length 4. This matrix may be accessed in different ways by configuring increments within defined nested loops for access. For example, if an increment is 1 in an X direction and 0 in a Y direction, then, during the iterations, a row may be read one word at a time—e.g. A, B, C, D. At the end of the row, the Y increment is applied. If it is set as 0, then nothing happens at the end of the row and subsequent iterations start reading a next row linearly from where the previous row iteration ended, e.g. D, E, F, G. This may continue such that the data is read as "ABCDDEFGGHIJJKLM", repeating every fourth word and ignoring the last three words. If there is an increment of 1 in both X and Y directions then this may allow iteration along a row of words (e.g. taking words in sequence across the width-A, B, C, D) before moving to a next row (e.g. after the first 4 words are read and a row is complete, the Y increment advances by 1 again, so the next row starts at E—E, F, G, H). In this case, "ABCDEFGHIJKLMNOP" is read. By configuring the size, and the increments, then a programmable path through the data may be determined, and this may be controlled by one or more of the address generator 134 and the control unit 150. For example, setting the X increment as 4 and the Y increment as −11 would read the sequence: "AEIMBFJNCGKODHLP", i.e. read along the columns and effectively determining the transpose of an original matrix of data having a width and height of 4 words.

In use, the matrix memory 132 may be used to store both secret keys and public keys as well as working variables. These variables may be represented as masked shares as described in more detail below. Visibility of the matrix memory 132 to a bus controller may be limited. Within an FPGA implementation, the matrix memory 132 may be implemented using Block RAM (BRAM) resources. Byte parity error checking or similar may be created using memory compilers in ASIC implementations. In certain variations, matrix memory 132 may be externally available, e.g. accessible by the external computing system or authorised components of said system. In general, the matrix memory 132 is defined within a security boundary, however, this boundary may be maintained logically rather than physically in certain implementations (e.g., a security boundary similar to the dashed line forming cryptographic system 110 in FIG. 1). In certain variations, the matrix memory 132 may be implemented using memory of the external computing system (e.g., RAM for said system) that is shared with other processors of the computing system. In these variations, the underlying memory used to implement the matrix memory 132 may be secured (e.g., relate to reserved addresses and/or have controlled access such that access from authorised processes is not enabled). The cryptographic system 110 may be configured such that memory addresses within the matrix memory 132 and access patterns do not leak secret information. One approach using masking to provide confidentiality guarantees against direct extraction of individual bits is described in more detail later below. Due to masking and/or cryptographic control, the matrix memory 132 may be implemented using any known memory technology (e.g., such as available RAM technologies). In one case, the matrix memory 132 is implemented using one or more of error-corrected memory, scrambled memory, encrypted memory, and obfuscated memory to enhance security.

In certain implementations, the cryptographic math unit 130 has a set of source registers and a set of destination registers for use in performing an arithmetic operation. These registers may form part of the arithmetic unit 136, where data is transferred between these registers and the matrix memory 132. In this case, the address generator 134 is configured to determine addresses within the matrix memory 132 for data to be written into, or read from, the source and/or destination registers (e.g., for a given iteration of the arithmetic unit 136). In one case, the arithmetic unit 136 may comprise a plurality of registers that may be used as either source or destination registers depending on the operation (e.g., as configured by the control unit 150). Although reference is made to source and destination registers, it should be noted that in certain implementations data may be alternatively directly read from locations in matrix memory 132.

Modes of operation for memory access may depend on the form of memory that is used to implement matrix memory 132 and/or the number of ports that are available. Certain memory technologies may have associated modes of operation with fixed rules for memory access. With certain memory implementations, it may be possible to read and/or write efficiently to multiple addresses (e.g., within RAM implementing the matrix memory 132) simultaneously. For example, depending on the number of ports, it may be possible to read from and/or write to multiple locations (e.g., representing one of A, B and C or one of C and D) during any one iteration. Also, although A, B, C are referred to as sources of input data and C, D as sources of output data, in actual implementations any memory address may be used as a data source (e.g., where data is read for use as input for an operation) and/or a data destination (e.g., where data is written for use as output for an operation). Parallel read and/or write operations may be performed for "mask writes" for masking for side-channel security (e.g., as discussed below) and butterfly operations for Number Theoretic Transforms (NTT) operations. The address generation performed by address generator 134 also allows for a flexible ordering of operations. For example, this may be achieved by configuring address increments for one or more dimensions of the matrix memory 132. As an example, if an address generator for source data A uses an X dimension (width) increment of 0 this implements a column matrix and there may be no need to re-read a value before an address is incremented at the end of a matrix row.

Returning to FIG. 1, in use, an operation performed by the arithmetic unit 136 is selected by operation control unit 138 based on an operation control signal (shown as OPER) from the control unit 150. The operation control unit 138 receives the operation control signal and configures the arithmetic unit 136 to perform the operation indicated by the operation control signal. This may involve setting the function "oper" that is performed on the data stored in the source registers. The set of available operations that are performed by the arithmetic unit 150 may include specific integer arithmetic functions that are used frequently by post-quantum cryptographic methods, such as lattice or code-based cryptographic methods. Integer arithmetic functions may include multiplication, addition and subtraction operations that are performed on one or more bit sequences that are deemed to be representative of integer values (e.g. 8, 16 or 32-bit integers). Boolean operations may also be performed, e.g. bit sequences read from memory as the operands may be treated as a sequence of independent bits (e.g. for bit/bitwise logic). Different bit length values may be supported. The indicated operation may be performed upon binary data stored within one or more source and destination register. Although in practice registers may be used in many implementations to temporally store data read from or written to the matrix memory 132, it should be noted that certain implementations may read from or write to matrix memory 132 directly without intermediate storage in one or more source or destination registers.

The address generator 134 controls which matrix memory locations are read as operation inputs ("sources") and/or are written to as operation output ("destinations"). If source and destination (i.e., arithmetic) registers are used (e.g., four registers A, B, C and D), each register may have its own address generator within the address generator 134 that is able to specify a non-sequential access pattern. The address generator 134 may be configured to determine a two-dimensional "blit" window within the matrix memory 132. The address generator 134 may be configured to store one or more counters for nested loop computation as described above. For example, to implement a two-dimensional "blit" window, the address generator 134 may use two nested layers of counters for each source or destination register, the counters being used to represent a "width" and a "height" of the window (i.e., a two-dimensional array of values). The address generator 134 may control the nested looping that implements the matrix memory 132, e.g. determining how locations in memory are iterated through to access two-dimensional windows of values. For example, by controlling the addressing for each arithmetic register, the address generator 134 may control row operations and matrix transposition, sequences of FFT butterfly steps, and/or the gated gathering of data words for rejection sampling. This form of addressing allows vector-matrix, polynomial-polynomial, and/or large integer multiply operations to be executed in a single cryptographic system "atomic" operation (i.e., a single "blit"). Further details of operations that may be performed by the cryptographic math unit 130 are described in WO 2021/032946 A1.

In a "gather" mode, the arithmetic unit 136 may be controlled to affect the stepping of one or more address generators (i.e., provided as part of address generator 134) to perform rejection sampling (i.e., to select values that satisfy defined criteria). This "gather" mode may provide triggered stepping such that an access pattern is not completely predetermined (e.g., as compared to other operations performed by the arithmetic unit 136); however, as this triggered stepping may be used exclusively for rejection sampling from random inputs it does not leak secret information.

In the example 100 of FIG. 1, the cryptographic system 110 further comprises a permutation unit 140. This may comprise an Extendable-Output Function (XOF) unit configured to apply cryptographic operations to generate an indefinite-length output stream. The permutation unit 140 may comprise an optional unit that is provided in preferred implementations. In the example 100 of FIG. 1, the permutation unit 140 is controlled by the control unit 150 and is communicatively coupled to the arithmetic unit 136. The permutation unit 140 is configured to implement a (cryptographic) permutation computation. In one case, the permutation unit 140 is configured to implement the KECCAK-p permutation as described in the Federal Information Processing Standards (FIPS) 202 (or Secure Hash Algorithm 3—"SHA-3"—standard)—"SHA-3 Standard: Permutation-Based Hash and Extendable-Output Functions", FIPS PUB 202, National Institute of Standards and Technology (NIST), August 2015, which is incorporated herein by reference. As described in Section 3 of the FIPS 202 standard, each round of a cryptographic permutation may comprise a composition of five individual (permutation) steps: theta: $\theta(A)$, rho: $\rho(A)$, pi: $\pi(A)$, chi: $\chi(A)$, and iota $\iota(A, i_r)$. The last step takes in round-constant parameter $i_r$. The composite round function in this standard may thus be defined as:

$$Rnd(A, i_r) = \iota(\chi(\pi(\rho(\theta(A)))), i_r).$$

In this example, the permutation unit 140 may be configured to perform this composite round function—Rnd, e.g. either for one round or for a plurality of rounds. When the size of permutation input A is 1600 bits, a composition of twenty-four of these round functions (with specific round constants $i_r$) constitutes KECCAK-p[1600, 24]. This then provides a basic building block of SHA-3/SHAKE hash functions as described in the FIPS 202 standard. It also provides a basic building block for many other derivative primitives. Beyond KECCAK-p, other examples of cryptographic permutations include the B-bit permutation of ASCON, described by Christoph Dobraunig, Maria Eichlseder, Florian Mendel and Martin Schläffer, in "Ascon v1.2" Proposal to NIST LWC standardization effort, March 2019 which is incorporated by reference herein. For example, the permutation unit 140 may perform an ASCON permutation to generate a random bit sequence that may be used for masking as described below. In general, the permutation unit 140 may be used for one or more internal mask generation operations that are used to masquerade internal data with noise to protect against side-channel attacks (e.g., as described in more detail later below).

In the present example, the permutation unit 140 is integrated with the cryptographic math unit 130 and controlled using control registers of the cryptographic math unit 130 (e.g., via the set of control registers 124 in FIG. 1). Permutations performed by the permutation unit 140 may be configured and initiated by the control unit 150 and/or other components of the cryptographic math unit 130. This configuration may include setting the rate and data block size for the permutation to be performed by the permutation unit 140. The address generator 134 may be used to generate read and/or write addresses for a permutation state, and the permutation state may be stored within the matrix memory 132 (e.g., as well as internal data registers for the permutation unit 140). Aspects of the permutation unit 140 may be based on the cryptographic permutation unit described in WO 2021/014125 A1, which is incorporated by reference herein.

The permutation unit 140 may be used to perform one of a number of defined permutation operations. These may comprise one or more of: a cryptographic absorb operation, a cryptographic squeeze operation, a cryptographic sampling operation, and a cryptographic random masking operation. The cryptographic absorb operation may comprise receiving an input data word and either overwriting a specific permutation state word (e.g., one of a plurality of data words representing the state for the cryptographic permutation) with the input data word or performing a binary operation on a combination of the input data word and the specific permutation state word (e.g., an XOR operation). This may represent the "absorption" of an input data word into the permutation state. The cryptographic squeeze operation may comprise passing a specific permutation state word from the permutation unit 140 to the arithmetic unit 136 (e.g., for use in arithmetic operations and/or for outputting to the matrix memory 132). This may represent the "squeezing" of a permutation state word from the permutation state. Cryptographic sampling operations may comprise statistical sampling operations such as binomial functions and/or using a cumulative distribution function (CDF). The CDF function may comprise looking up a CDF value within a software or hardware lookup table (e.g., a hardware lookup table may be defined for a normalised Gaussian distribution). Cryptographic sampling operations may be applied by the arithmetic unit 136 before writing the output to matrix memory 132. For cryptographic random masking operations, an output of the permutation unit 140 may be used as a masking pseudo-random number generator for binary sequences that are used for masking operations as described below. This, for example, may be used for converting between different masking representations. In certain cases, the cryptographic system 110 may have a "mask random" function that may or may not use the permutation unit 140 and may output a random bit sequence according to a non-deterministic function, e.g. this function may return a random word every step or iteration to be used for masking operations. While the permutation unit 140 may be addressable, an output of the mask random function may not be addressable.

In cases where the permutation unit 140 is configured to perform a Keccak-p permutation using a 1600-bit Keccak state, this state (i.e., the permutation state) may be decomposed into data words having the same size as the bandwidth of the couplings within the cryptographic math unit 130. In a masked permutation mode, a permutation state may be divided into separate shares, similar to the masking operations described below. Each permutation round may be further decomposed into distinct steps that are applied to each share. In one case, an XOF operation may itself be masked, resulting in two "layers" of use for the permutation unit 140—one in generating the masks for the masking and one in performing a masked permutation. For example, in cases where secret data is used within the Keccak permutation, the permutation may be applied to masked data. A masked implementation of a Keccak permutation may be based on a Threshold Implementation using re-randomisation as described by J. Daemen in "Changing of the Guards: a simple and efficient method for achieving uniformity in threshold sharing", IACR-CHES-2017, which is incorporated by reference herein. In this case, there may be m (e.g., three) 1600-bit shares that are stored in the matrix memory 132 with adaptations for the specific hardware of the cryptographic system 110.

In certain examples, the address generator 134 may be additionally wired to one or more state registers of the permutation unit 140, such that the address generator 134 is able to index individual data words relating to the permutation state controlled by the permutation unit 140. In certain cases, a window width of the cryptographic math unit 130 (e.g., a matrix width set in relation to the matrix memory 132) may be used to specify a permutation rate (e.g., a Keccak rate), while a window height (e.g., a matrix height set in relation to the matrix memory 132) may specify a number of blocks for the permutation. A row end with a window or matrix may then trigger a permutation. This configuration may allow for absorb and/or squeeze operations (such as those that implement the SHA-3 SHAKE permutation) to be executed without control unit interaction. Further details on the window or matrix form may be found in WO 2021/032946 A1 and further details on permutation implementations may be found in WO 2021/014125 A1, both of which are incorporated by reference herein.

Examples of Pipelined Operations

The cryptographic math unit 130 is configured to perform arithmetic operations with complex addressing efficiently. In certain cases, such as those described with reference to FIGS. 2 and 5 below, pipelining may be used to increase efficiency and speed of processing. For example, the arithmetic unit 136 may be arranged to implement parallelism and so provide Single Instruction, Multiple Data (SIMD) functionality. This may also be combined with multi-port memory for the matrix memory 132, such that different memory locations may be accessed (e.g., read from or written to) via each port. The exact pipeline configuration may depend on implementation requirements. A set of iterations by the cryptographic system 110 may form part of an atomic operation from the point of view of the external computing system. For example, they may be instructed with a single instruction of the computing system. The set of iterations may be used to perform a single cryptographic operation upon a plurality of sources, where those sources have an associated multi-dimensional array of data as stored in the matrix memory 132. This single cryptographic operation may be referred to as a "blit" (e.g., of in relation to the cryptographic math unit being a "blitter"). In one case, dual port memory may be used, and, using parallelism, 2, 4 or 8 integer operations may be performed for each two-cycle "blitter" step (where each "blitter" step or "blit" performs a single mathematical operation). The set of iterations may be synchronised to the clock cycle of the computing system, e.g. the complete set may be performed in one clock cycle of the computing system. This may allow a considerable speed increase as the same cryptographic operation, when performed by the computing system alone, may require a plurality of fetch, decode and execute cycles on both data and address memory of the computing system, while the cryptographic system 110 may allow the result to be available in accessible memory following a much shorter time period. In certain examples, the clock rate of cryptographic system 110 may be different to that of the computing system. In these cases, either the cryptographic system 110 or the computing system may execute individual steps in a single cycle or more cycles. The number of steps that are performed may depend on memory bandwidth, and in case of the computing system, the complexity of the instruction.

Figure 2:
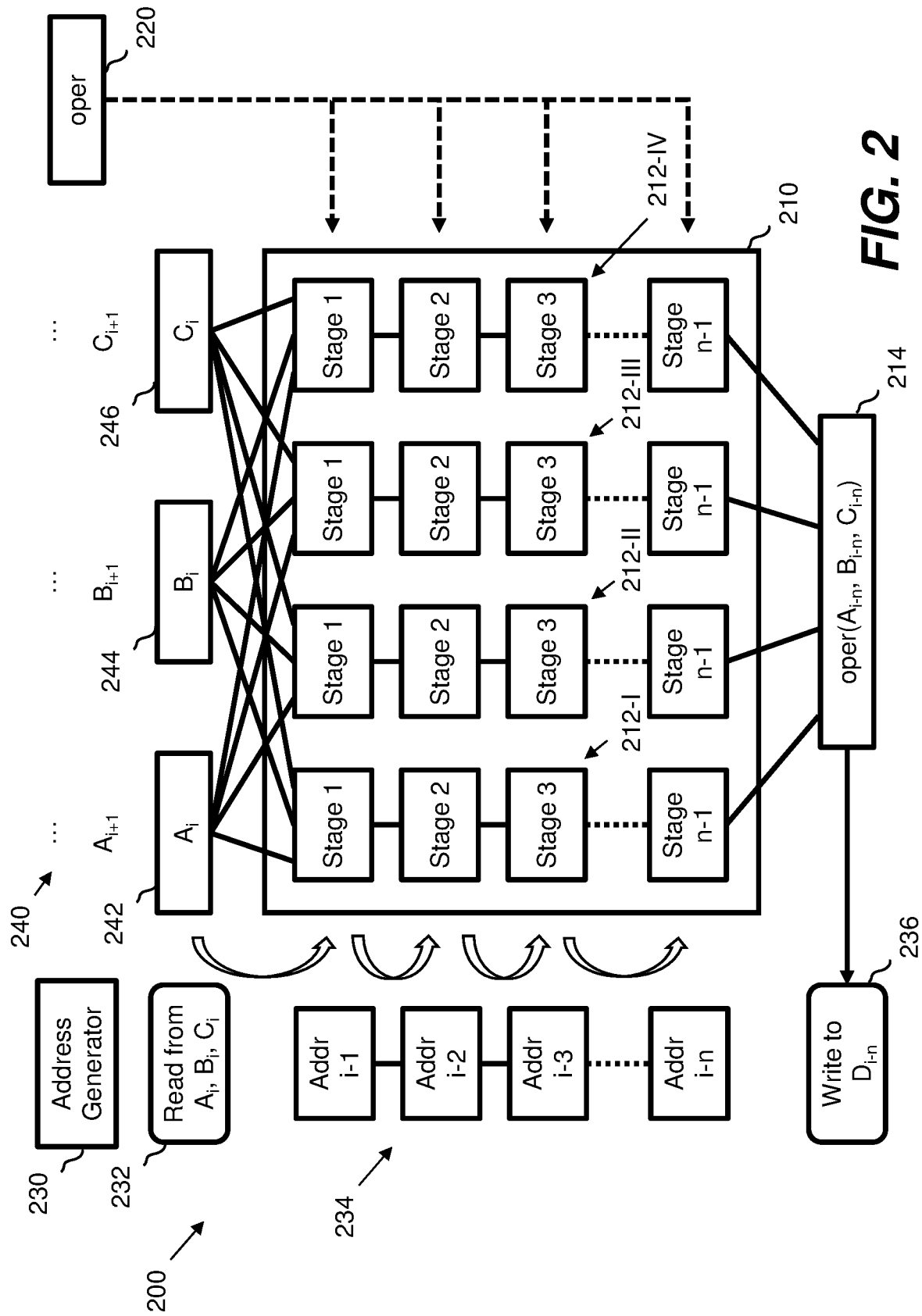
FIG. 2 is schematic illustration showing a pipelined operation performed by an arithmetic pipeline unit according to an example.

FIG. 2 shows an example 200 of how the arithmetic unit 136 may be used in a pipeline mode to process multiple input streams in parallel. The pipeline mode may also be used to implement security masking as described later below. FIG. 2 shows a pipelined operation 210 where a plurality of computation streams 212 are performed in parallel. It should be noted that FIG. 2 is a schematic illustration of one example pipeline configuration, different implementations may have different pipeline configurations, and actual underlying hardware configurations may vary depending on implementation (e.g., in the form of circuit patterns for silicon fabrication and/or FPGA programmed gate configurations). In FIG. 2, four computation streams 212 are shown but the number of computation streams may vary depending on configuration as set by the control unit 150, e.g. the number of computation streams may depend on a length of a set of independent data elements being processed in parallel. Data elements may be binary data elements of length 8, 16 or 32 bits, or in certain cases even smaller units, such as a Galois Field element of a variable q—GF(q)—or a Boolean GF($2^n$) element with a specific reduction polynomial. The pipelined operation 210 may represent a single operation (a "blit") as instructed by an external computing system via the set of bus interfaces 120. The single operation is shown as "oper" in FIG. 2, similar to the "oper" of the previous examples. The "oper" instruction 220 specifies the pipeline for the entire cryptographic math unit operation and may be provided via the OPER control signal as received by the operation control unit 138 (e.g., the "oper" instruction 220 in FIG. 2 represents the operation control effected by the operation control unit 138 on the arithmetic unit 136).

In FIG. 2, each of the four computation streams 212 comprises a plurality of stages that are computed in series over time for each stream. In FIG. 2, each of the four computation streams 212 comprises stages 1 to n−1, where in the last nth stage 214 the final output of the computation is determined. Hence, in FIG. 2, the pipelined operation 210 runs for n internal cycles. During the pipelined operation 210, data access from and/or to one or more of the matrix memory 132 and the permutation unit 140 is controlled by address generator 230, which may comprise the address generator 134 in FIG. 1. To start the pipelined operation 210, data is received from input variable streams 240, which may comprise data obtained from the matrix memory 132 and/or the permutation unit 140. In certain cases, data from the permutation unit 140 may be routed to the matrix memory 132 such that all data access operations are performed with respect to the matrix memory 132. In the present example, three input variables A, B and C are retrieved as input for the pipelined operation 210. In the example of FIG. 2, the address generator 230 determines the addresses for each of these input variables (e.g., in the matrix memory 132 or specifying registers of the permutation unit 140) and at block 232, data (i.e., sequences of bits) is read from the addresses ready for the pipelined operation 210. This may comprise copying data from specific addresses in matrix memory 132 into input registers of the arithmetic unit 136. In FIG. 2, the three input variables A, B and C are shown as 242, 244, and 246. To start the pipelined operation 210, data from each of the input variables A, B and C are provided as input to the first stage (i.e., stage 1) of each of the computation streams 212. For simple Boolean operations, such as (bitwise) AND, OR, and XOR, the data may comprise bit sequences of the same length as the original input variables. For example, if the bandwidth or data width of the arithmetic unit is 32 or 64 bits, the input variables having a length of 32 or 64 bits may be copied to each of the first stages (e.g., as shown in FIG. 2, where arithmetic may be performed (e.g., an XOR may be a bitwise operation that may be seen as 32× or 64× parallel 1-bit XOR operations). For certain cryptographic algorithms, the data received by each stage may be of a different size to the input variables. For example, the Dilithium post-quantum digital signature algorithm uses arithmetic operations on 23-bit values (with q=8380417). In this case, with a 32-bit input (say), a 32-bit value from each input variable may be received, the top 9 bits may be ignored, the arithmetic may be performed (involving a modulus q), and then an output may be written as a 32-bit value with the high bits set to zero. Within a 64-bit system, two 23-bit paths may be accommodated within each 64-bit variable, e.g. a 64-bit value of A may be divided into two 32-bit "halves", where the first high 9-bits in each "half" are ignored to operate on 23-bit values. The result of arithmetic is then written as 64-bit values with the high 9 bits set to zero as for the 32-bit case. Hence, a 64-bit version of the cryptographic system may have double the throughput of a 32-bit version for the Dilithium algorithm.

As described below with reference to FIG. 3, the data received by a stage may comprise shares of an input variable (or the first one or more stages may compute the shares). How the portions of each input variable are provided to each of the computation streams may be configured as part of the operation (i.e., the "oper" configuration), FIG. 2 only shows one possible example. In FIG. 2, each of the computation streams receives data from each of the input variables 242 to 246 and then applies the n−1 computations stages in series. Each set of stages performed in parallel (e.g., each row across the computation streams 212 in FIG. 2) may involve matrix memory 132 access as indicated by address streams 234. In one case, the address generator 230 outputs address streams 234 that are propagated in stages at the same time as the computation stages. In this case, an end result of a computation stage may be written at a matching address within the address streams (e.g., one or more addresses generated for a corresponding "address" stage). This may avoid pipeline hazards. Each computation stages applies the same "oper" instruction 220 repeatedly. There may be thousands of internal cycles for the pipelined operation 210 (e.g., n may be large). The repetition of the "oper" instruction 220 and the dedicated cryptographic matrix memory 132 allow simple control of the pipelined operation 210 to the capacity of the cryptographic math unit 130 (e.g., capacities set by internal bus bandwidths and register data word lengths). After the n−1 stages of each computation stream 212 have been applied, at the nth stage 214 a final result is determined. This may comprise re-combining the individual results from each computation stream 212. The final result is then copied to a destination address (e.g., within matrix memory 132) as determined by the address generator 230.

The cryptographic system 110 of FIG. 1 may be configured to implement many different post-quantum cryptographic operations. Many of the operations performable by the arithmetic unit 136 (e.g., as specified by the "oper" instruction 220) may be stateless in the sense that the resulting data word depends only on corresponding input values. In this case, the execution order used by the cryptographic math unit 130 may be flexible (e.g., enabling the serial operations within in computation stream 212 in FIG. 2). In certain cases, information may be passed from a first invocation of a pipeline stage to a subsequent invocation of the pipeline stage (e.g., for specific arithmetic modes). This may allow input data to be combined with data from a previous input. Although, in a default operation, stage n passes information to stage n+1 in the pipeline, stages may also be heterogeneous and so certain information may be forwarded across multiple stages (e.g., skip one or more subsequent stages) and/or information may be feedback during operation. For example, an overflow such as a carry or borrow in large integer arithmetic operations may be passed between pipeline stages, either using internal arithmetic registers or addresses within matrix memory 132 that are written to at the end of each stage and read at the beginning of a next stage. In one case, a feed-back source (e.g., a C data variable) may act as a "carry" for memory comparison operations. This, for example, may occur while using a butterfly mode or where a portion of a destination register D may be used, e.g. a single-word result may be returned as D for the operation (i.e., "oper"). Or, for example, consider a hypothetical example of multiplying a single integer "3" with a "long" integer "57" (in actuality, operations will be performed with binary values, but a decimal example is provided here as an analogy for ease of explanation). A digit-long integer multiply implementation may have two stages: "multiply digits" and "add carry". These stages may operate at the same time. A feedback variable in the form of a carry may be used, which is initially set to 0. Starting from the right of the long integer, a first "multiply digits" operation is performed as 3*9=27, the right-hand side—7—is written out and the left-hand side—2—is set as the carry forward. The "multiply digits" stage does not need to know the carry to start multiplying the next pair 3*5=15, but the next invocation of "add carry" may now be computed as 15+2=17, where 7 is written out and 1 taken as the carry bit. The last round may then perform a further "multiple digits" operation with a zero-type multiply operation, 3*0=0, and the last "add carry" just writes out 1, ending up with the final result provided as the three written out values 1,7,7 (i.e., 3*59=177). Comparison operations may also involve persistent data being fed back within the pipeline. For example, a state may be maintained that indicates the status of a comparison of previously processed words (e.g., a first non-equal word changes the stage feedback of the entire comparison as "non-equal").

FIG. 2 thus provides an example of how the arithmetic unit 136 may comprise an arithmetic pipeline unit that receives control data (e.g., the "oper" instruction 220) indicating a selected operation to perform from the control unit 150 and that performs the selected operation as a plurality of stages over time. The plurality of stages may comprise a plurality of parallel processing streams (e.g., computation streams 212), where the plurality of parallel processing streams receive data (e.g., 242 to 246) accessed from the matrix memory 132 (e.g., via the actions of address generator 230). As such, the arithmetic unit 136 performs the pipelined operation 210 to implement an SIMD-like functionality where multiple pipelines function in parallel.

The cryptographic operations performable by the arithmetic unit 136 (e.g., as instructed by the OPER control signal in FIG. 1 or the "oper" instruction 220 of FIG. 2) may comprise specific mathematical operations and representations to support post-quantum cryptographic algorithms or other targets for accelerated computation. In general, operations may comprise a set of available functions that are configured to manipulate one or more bit sequences read from one or more data sources (also referred to herein as "sources", such as A, B, C) and to store a result of the manipulation as destination data (also referred to herein as "destinations", such as C and D). A non-limiting set of example cryptographic operations include: multi-input bitwise Boolean operations; large integer arithmetic; polynomial arithmetic; sampling; normalisation and comparison; data element reordering; serialisation and deserialization transformations; and randomised operations. Multi-input bitwise Boolean operations include two- or three-input operations such as AND, OR, ANDN, XOR3, and CMOV (conditional move). A sequence of these operations may be used for bit-sliced Boolean circuit computations. Large integer arithmetic may comprise arithmetic with integers represented by data word bit sequences that result in one or more carry bits. The large integer arithmetic operations may include multiplication, addition, subtraction, reduction, and combination operations (e.g., multiply-accumulate/subtract-D=C+AB or D=C-AB). Sampling may include obtaining values from statistical distributions such as binomial sampling or sampling using CDF tables. Sampling operations may also include comparison and gather operations for rejection sampling (e.g., based on uniform or non-uniform distributions). The comparison includes masked comparisons using masking as discussed below. Normalisation and comparison operations include operations that yield only a single-word result such as summation of elements, inner product computations, Hamming Weight computations, and full-scan (e.g., no early exit) comparisons. Data element reordering may comprise arranging data elements for pipelined operations (such as data elements 242 to 246). For example, data loaded into A, B, C source registers may be (re) arranged to perform tasks such as matrix transposition, rotation, shuffling, or reversal of data elements. Serialisation and deserialization transformations may include vector-result non-linear functions and transformations, such as those needed for endianness conversions or alignment. Randomised operations may comprise operations that use random variables such as masked arithmetic and mask conversion operations (e.g., between Boolean and additive masking). Random values for randomised operations may be sourced from one or more of: the permutation unit 140 and an internal (to the cryptographic system 110) random number generator, such as an internal pseudo random number generator that is seeded using a seed provided by an internal or external true random number generator.

The arithmetic unit 136 operates on bit sequences. These bit sequences may be provided as data words, where the length of the data words is set based on word lengths of the matrix memory 132 and/or internal communication buses (e.g., within the cryptographic math unit 130). The bit sequences may represent one or more of: numbers, points, vectors, matrices, polynomials, rings, fields, and other algebraic structures. Different bit sequences may represent different portions of these representations, e.g. data words read from and/or written to the matrix memory 132 may represent portions of matrices or polynomials. In certain examples, the arithmetic unit 136 operates on bit representations of one or more of: modular integers (e.g., mod $2^n$); small prime fields (e.g., GF(q)); representations in Montgomery's form rather than canonical form (which may allow rapid modular reduction within the pipeline); projective coordinates and other representations that are useable for Elliptic Curve Points; prime field q in the form $q=c2^n+1$ for particular defined cryptographic algorithms; vectors of elements in binary fields (e.g., GF ($2^n$)), where reduction by a fixed polynomials base may be performed with a pipelined operation; masked representations as described below for side-channel protection; and other redundant bit representations for additional side-channel protection. As lattice cryptography operates using either modulus $2^n$ arithmetic or small prime q arithmetic, the pipelined operation and bit decomposition described herein is particularly useful. Similarly, code-based and multivariate cryptography benefits from small binary fields, which are also supported by the described configurations of the cryptographic system.

It should be noted that the configuration of the pipelining may vary between implementations depending on requirements and the cryptographic operations being implemented. In FPGA implementations, pipelining configurations may be set via Hardware Description Language (HDL) definitions. For on-silicon implementations, pipelining configurations may be set depending on design requirements such as implementation size, area cost, and power usage. The number of stages and computational streams may be parameters of each instantiation of the described examples.

Additionally, the number of pipelining stages may not significantly affect the programming interface—e.g., an operation may be configured with 1 or 64 cycles, with variable latency and/or throughput trade-offs, but still have a common fixed programming interface (e.g., that may be callable from the external computing system via data written to control registers 124). Different applications may use the same programming interface but configure the cryptographic system 110 for their specific requirements, e.g., an embedded system may specify a smaller footprint at the cost of speed of operation, while a server or supercomputer implementation may specify increased parallelism and throughput. Pipelining as described herein may be seen as an implementation mechanism to increase throughput at the cost of (silicon) area. For example, consider a six-step algorithm with steps S1-S6. It may not be possible to perform all the steps in a single cycle since this would necessitate very long circuit paths and the design may not meet "timing closure" against operating frequency. In this case, rather than iterating steps S1-S6 in six cycles, each step may be implemented as a physically separate pipeline stage. This way a first stage may be fed input values on every cycle, and in turn feeds a second stage, and so on, and a finished result may be provided at each cycle. In this case, the latency between input and output remains at six cycles but the throughput is sixfold compared to an iterative implementation. For the cryptographic operations described herein, throughput is often more important than latency, as the building blocks of the operations are fast cryptographic primitives such as multiplication or masking conversion that are relevant to cryptographic tasks and that are performed on long bit sequences.

Examples of Masked Computation

In certain examples described herein, the security of the cryptographic system 110 may be increased using masked computation. Masked computation allows for protection against side-channel attacks. Side-channel attacks are those that seek to determine bit patterns of secrets being manipulated by the cryptographic system 110 based on, for example, leakage of secret information via electromagnetic emissions, fluctuations in power use, operation timing, or other unintended side channels. While physical shielding may be provided to allow a certain amount of protection, improved security may be provided by masking the (secret) bit sequences that are manipulated using the cryptographic math unit 130, such that even with sophisticated measurements of electromagnetic patterns from outside the cryptographic system 110 do not provide information on original secrets such as cryptographic keys and the like loaded via the set of cryptographic registers 122.

In the present examples, the cryptographic system is configured to perform masked arithmetic computations by decomposing secret data values as accessed via the set of bus interfaces 120 into a plurality of data shares. The control unit 150 is then configured to control the arithmetic unit 136 and the address generator 134 to apply at least one of the set of defined arithmetic operations as a plurality of independent linear operations on the respective plurality of data shares. Masked computation may operate synergistically with the "no-touch" control of the cryptographic math unit 130 via the internal bus 166 and the pipelined operation configuration shown in FIG. 2. The approaches of masked computation applied by the cryptographic system 110 aim to minimize the leakage of information by increasing the signal-noise ratio of measurable side channels, such as power supply fluctuations or electromagnetic emanations. In the present examples, one or more of the control unit 150, the cryptographic math unit 130 (including the arithmetic unit 136), and the permutation unit 140 are adapted to support both masked and non-masked computation. In preferred examples, all of the aforementioned components may be adapted to support both modes of computation (e.g., as selectable by the external computing system and/or as part of a defined configuration of the cryptographic system 110).

In certain examples, secret inputs and/or outputs are split into data shares in a masked computation mode. The number of data shares may be configurable and set by a parameter of the cryptographic system 110 (e.g., there may be d data shares). In one case, data received via the set of cryptographic registers 122 in FIG. 1 (e.g., SSPs) may be split into data shares. A simple example of an operation applied to a set of three data shares (e.g., d=3) is shown in FIG. 3; however, different numbers of data shares may be configured. While FIG. 3 shows one set of operations on the data shares for ease of example, it should be noted that the operations may be applied as computation streams as shown in FIG. 2 (e.g., the input to each of the first stages in FIG. 2 may comprise data shares of the three inputs A, B and C). In certain cases, to improve security there may be restrictions such that only one data share may be processed at any one time by the arithmetic unit 136.

In masked post-quantum cryptographic computation, arithmetic may be transformed into corresponding masked operations. For example, an unmasked (plain) arithmetic operation between variables X and Y, resulting in Z: Z=X op Y, may be transformed into a series of arithmetic operations from shares $\{X_i\}$ and $\{Y_i\}$ to provide shares $\{Z_i\}$. This example is shown in FIG. 3.

Figure 3:
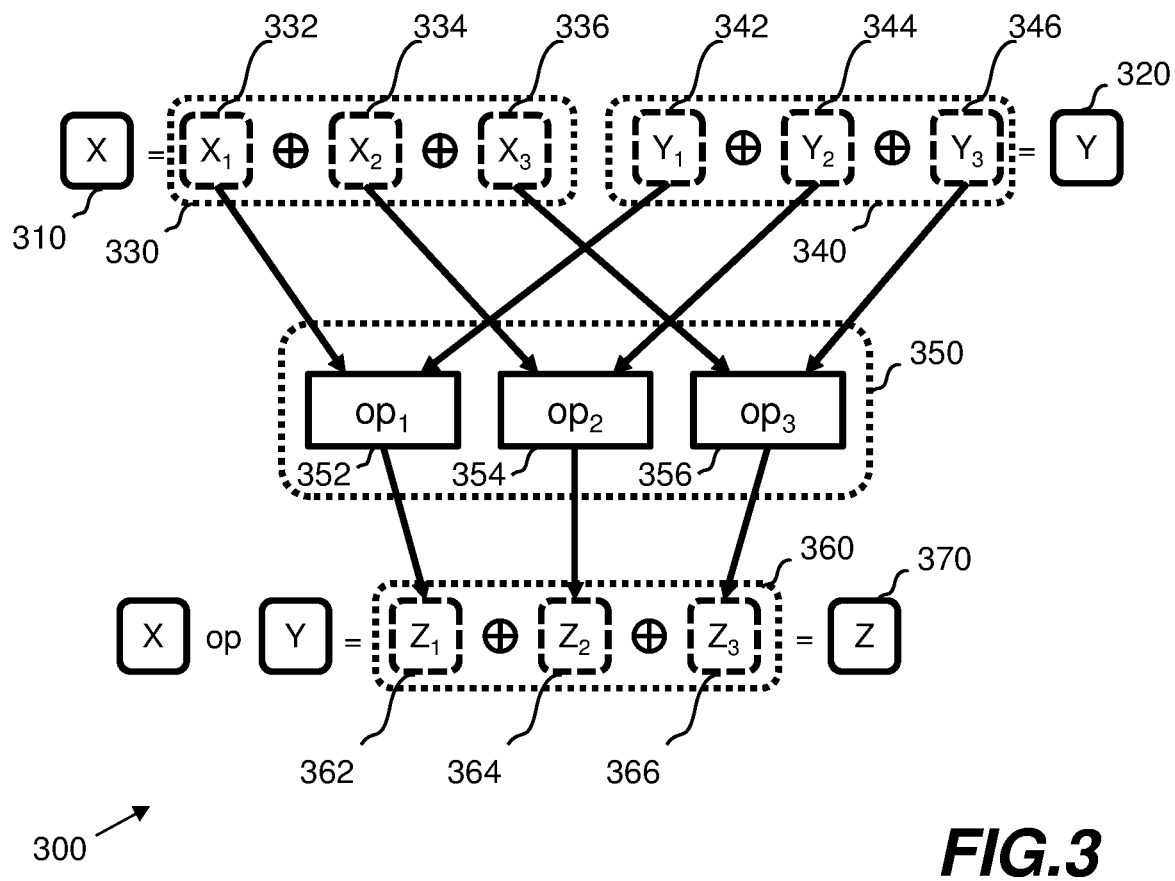
FIG. 3 is a schematic illustration showing an example of masking being applied to secret data.

FIG. 3 shows an operation 300 performed on two input data variables 310 and 320 (shown as X and Y). The two input data variables 310 and 320 may comprise SSPs that are received via the set of bus interfaces 120. In certain cases, they may comprise secret data variables that are received in an encrypted form and that are only decrypted within the matrix memory 132. Each of the two input variables 310 and 320 are split into respective sets of data shares 330 and 340. In this example, there are three data shares, such that the first input variable 310 is split into data shares 332, 334 and 336 and the second input variable 320 is split into data shares 342, 344, and 346. Each of the data shares may comprise a sequence of bits of the same length as a sequence of bits representing the input variables. In the example of FIG. 3, the input variables are split into data shares using Boolean masking; however, different forms of masking may be available as a configurable or selectable control parameter. For example, there may be an option to generate data shares using either Boolean masking or arithmetic masking (amongst others). The cryptographic system may further be configured to convert between different forms of masking for certain operations. In the example of FIG. 3, the data shares are generated using a binary exclusive-or (XOR) summation operation (e.g., as represented by $\oplus$), where the sum may be over a configurable number of data shares d. This may be represented in shorthand as $X = \oplus X_i$ where $1 \le i \ge d$. In this case, each of the input variables 310 and 320 equal the XOR sum of the respective data shares 330 and 340.

The generation of the data shares may be performed as a set of initial cryptographic math unit operations. For example, a Boolean masking decomposition may be performed by combining the initial input variable (e.g., 310 or 320) with a random mask generated by the permutation unit 140. In this case, d−1 data shares may be generated by creating d−1 random bit sequences, combining these with the original secret (e.g., 310 or 320), and then generating a dth share as a combination of the previous combinations. For example, in the case of FIG. 3, the shares 330 (or likewise for 340) may be generated as: $X_1 = X \oplus R_1$, $X_2 = X \oplus R_2$, and $X_3 = R_1$ @ $R_2$ where $R_i$ are uniformly random masks from the permutation unit 140—here a reconstruction of the original secret X requires all the individual shares $X_i$.

Returning to FIG. 3, once the data shares are generated, they are used to perform an operation 350. The operation 350 is performed as a set of independent operations 352, 354 and 356 that each receive corresponding data shares from the two sets of data shares 330 and 340, e.g. operation 352 is performed with data shares 332 and 342 as input, operation 354 is performed with data shares 334 and 344 as input, and operation 356 is performed with data shares 336 and 346 as input. Each independent operation 352 to 356 is a repeat of the same arithmetic unit operation in a similar manner to the computation streams 212 in FIG. 2 (i.e., the example of FIG. 3 may be seen to show a first stage with three computation streams with a shared "oper" instruction 220). Operations may be performed independently by ensuring that data for different data shares of a secret data value are not operated on within the arithmetic unit 136 contemporaneously, e.g. that they are kept separate in space and time. Each of the masked arithmetic operations 352 to 356 (including conversions to masked form) is designed so that all intermediate variables (e.g., "wires" in hardware circuits) are statistically independent of the (secret) sum of shares. The operations 352 to 356 are performed on the data shares of the secret but the data shares are not "collapsed" to reform the secret. Hence, the original secret is not "given away" to side-channel attacks.

In FIG. 3, after the operation 350 is performed on respective pairs of data shares, the result from each of the individual operations 352, 354 and 356 are provided as respective outputs 362, 364, and 366. The output set of data shares 360 may be recomposed to provide a result of the operation 350 as applied to the input variables 310 and 320 (i.e., Z=oper (X, Y)). In the example of FIG. 3, the recomposition may be performed by XOR summing the individual data shares, i.e. $Z = Z_1 \oplus Z_2 \oplus Z_3$. This may be performed as a last stage, e.g. when providing data as output via the set of bus interfaces 120 or following the completion of the operation 350, may be performed externally (e.g., by the external computing system), or even performed only when the data shares are encrypted as described below. In one case, secret data may not be exported from the cryptographic system 110 unless it is in an encrypted form.

In certain implementations (and/or defined configurations), secret information may be maintained as data shares for an entire key lifecycle. For example, secret keys may be generated as shares, stored and loaded into memory as shares (e.g., both internal and external memory, the latter via the cryptographic registers 122), and used as shares (e.g., in cryptographic operations). At the end of the life of the key, the shares may then be zero-cd. In certain cases, only secret information is operated on as data shares. In these cases, if a set of data shares representing secret information are encrypted (e.g., using encryption and/or encapsulation algorithms implemented by the cryptographic system), they may be collapsed together following encryption, as the data is no longer "secret" (i.e., it is protected by the encryption). For example, a stream cipher may produce ciphertext C from plaintext P and keystream Z=cipher(key) via C=P XOR Z where decryption is performed as P=C XOR Z. In cases where the cipher is implemented in a masked fashion, the keystream shares $Z_1$, $Z_2$, $Z_3$ may be generated from masked keys—$key_1$, $key_2$, $key_3$. In this case different ciphertext portions may be encrypted using respective keystream shares $C_1 = P_1$ XOR $Z_1$, $C_2 = P_2$ XOR $Z_2$, and $C_3 = P_3$ XOR $Z_3$. Following encryption, it is now possible to collapse the masks without giving away secret information, i.e. $C = C_1$ XOR $C_2$ XOR $C_3$. C can then be exported safely in an encrypted form that reveals no information about P.

As shown in FIG. 3, in certain examples, masked computation may be achieved using operations performed by at least the cryptographic math unit 130 (e.g., as a sequence of "blits"). A number of different operations may be combined as sub-operations to perform masked computation as a single atomic "operation" that is instructed by the external computing system. For example, masked computation may involve performing operations with at least the cryptographic math unit 130 where the input to operations are data shares, temporary data shares or random variables (e.g., as generated using the permutation unit 140). Sets of operations may also be efficiently pipelined to speed up computation.

Although the example of FIG. 3 shows a case of Boolean masking, in other examples, arithmetic masking may alternatively be used. In one case, arithmetic masking in the form of additive masking may be used to generate the data shares. Additive masking is analogous to XOR masking but uses integer or modular addition. In one case, the shares are computed as: $X = (\Sigma_d X_i) \bmod(q)$ where q may be an algorithm-dependent small prime or $q = 2^n$ modulus. As an example, additive masking may be implemented by wrap-around addition modulus $2^{16}$. The fixed constant q may vary for different cryptographic algorithms. For many cryptographic algorithms, q is less than 16 or 32 bits in size or exactly a power of two. As examples, the KYBER algorithm uses a q value of 3329 and the SABER algorithm uses a value of $2^{13}$. Values of q for different cryptographic algorithms may be hardcoded into the implementation of the cryptographic math unit 130. As an example, the number X=1238 may be represented using shares $X_1 = 1111$, $X_2=2222$ and $X_3=1234$ with a q value of 3329, since $X_1+X_2+X_3==4567$ mod $q=1238$ (using modular wrap around addition).

In certain examples, the cryptographic system 110 may be arranged to perform operations that convert between two different masking formats. For example, linear operations such as XOR or addition may only be independently applied to data shares if the data shares are in a corresponding masking format. In one case, Boolean masking may be converted to and from arithmetic masking. In a case where Boolean masking is converted to arithmetic masking, this may be performed by determining a second set of data shares $\{Y_i\}$ that have a sum that is equal to the XOR sum of a first set of data shares $\{X_i\}$, e.g. $S=\oplus X_i=\Sigma Y_i$. In a case where arithmetic masking is converted to Boolean masking, the reverse operation may be performed, e.g. a second set of data shares $\{Y_i\}$ may be determined that have a sum that is equal to the arithmetic sum of a first set of data shares $\{X_i\}$, e.g. $S=\Sigma X_i=\oplus Y_i$. In certain cases, the control unit 150 may be programmed to use the arithmetic unit 136 and the matrix memory 132 to perform conversion operations in the hardware of the cryptographic system 110 that are similar to the conversion operations described in the paper "An Instruction Set Extension to Support Software-Based Masking" by Gao et al, Cryptology ePrint Archive, Report 2020/77, which is incorporated herein by reference. For example, the aforementioned paper defines BOOL2ARITH and ARITH2BOOL conversion functions that in turn utilise underlying Boolean add (BOOLADD) and Boolean substitution (BOOLSUB) operations. These Boolean add and Boolean substitution operations in turn comprise relatively complex sequences of bit manipulations involving a "mask random" input. The present cryptographic system 110 provides a large advantage over the software implementations of the paper (e.g., that are typically performed by a central processing unit of the external computing system), as the cryptographic math unit 130 is designed (and optimised) for accelerated execution of long sequences of Boolean operations (e.g., as demonstrated by the pipeline of FIG. 2). Hence, the cryptographic system 110 allows much faster operations.

Certain arithmetic primitives that are applied as operations by the arithmetic unit 136 may be accomplished with the help of conversion functions within a masked mode of operation (or the conversion functions may be implemented with the direct operations). For example, for Boolean masked addition and subtraction, a set of output data shares $\{Z_i\}$ may be computed from input shares $\{X_i\}$ and $\{Y_i\}$ such that the XOR sums satisfy $X+Y=Z$ or $X-Y=Z$ (mod q). Other masked functions may follow the same pattern. Bitwise logic in a masked mode may be performed by applying, say, AND, OR, and XOR operations to arithmetic-masked or Boolean-masked data shares. Likewise, shifts, rotations and bit manipulations may be applied to arithmetic-masked or Boolean-masked data shares. Comparisons may be performed by analysing equivalence or ordered (e.g., using less-than or greater-than) of masked variables. The results of comparisons may also be masked (e.g., a true or false value may be a masked bit). Field arithmetic and special functions for post-quantum cryptography may also be applied to masked variables.

Certain post-quantum cryptographic operations operate on ring polynomials. For example, lattice-based cryptography utilises ring polynomial and matrix multiplications. Many of these multiplications are between secret polynomials and public polynomials. In these cases, the secret polynomials may be masked, and the public polynomials need not be masked. In a case of multiplication of a secret polynomial X with a public polynomial C, the secret polynomial may be split into d data shares for a masked mode of operation, e.g. such that $CX=CX_1+CX_2+CX_3$ (mod q). In this case, multiplying by a constant (the public polynomial C) only causes an O(d) increase in complexity. This means that lattice-based post-quantum cryptography is particularly suited to a masked mode of operation. As a comparison, a multiplication of two masked representations, e.g. $(X_1+X_2+X_3)*(Y_1+Y_2+Y_3)$, causes at least an $O(d^2)$ (i.e., quadratic) overhead in relation to the number of shares. Similarly, for many Number-Theoretic Transforms (NTT) that are used to implement ring and module algebraic objects used for known lattice cryptographic schemes, only one input of an NTT multiplication needs to be masked. This limits the overhead of applying a masking mode. Lattice cryptography additionally uses mixed bit-oriented operations such as right-shifts, "rounding," and masked comparison. These tasks can be accomplished with more efficient partial masking conversion tailored for each operation.

In certain examples, masking may comprise a "blit" (i.e., operation of the cryptographic math unit 130) that reads data to be masked (e.g., X) from a source location or register (e.g., A), obtains a random bit sequence R via an inbuilt internal operation, and then that writes the result of performing the masking to share destination locations or registers. For example, a simple case of arithmetic masking of data item X may involve splitting the data item into two shares $X_1$ and $X_2$ such that $X_1+X_2=X$. In this case, a first share $X_1=X-R$ may be written to destination D and a second share $X_2=R$ may be written to destination C. Remasking may be performed in a similar manner, although in this case the previous data shares are used as input. For example, the operation of the cryptographic math unit 130 may write a remasked data share—$X_i'$—to D as $X_1'=X_1-R$, where R is a new random value, and then write the new mask R to C, to provide temporary storage. Then, for the remasking, there is a second arithmetic step which reads R from memory and computes the second remasked data share as $X_2'=X_2+R$. Following remasking, arithmetic masking still applies, i.e. $X_1'+X_2'=X$. Note that the remasking operation avoids combining $X_1$ and $X_2$ directly. Similar operations may be performed for Boolean masking and/or for different numbers of shares. Masked arithmetic operations that use masking randomness internally may include conversion from arithmetic to Boolean masking (A2B) or vice versa (B2A). As described above, the cryptographic system 110 may provide a dedicated hardware (e.g., vector or matrix co-processor) implementation of masking operations similar to those described in the paper by Gao et al above. However, by using the cryptographic system 110 security is improved. For example, arithmetic is "remote-controlled" by the processor 152 (e.g., via the "no-touch" operation), whereas in the implementations by Gao et al, a general CPU may have access to secret data, which presents a security risk. Also, data flows in the present examples occur via the cryptographic math unit 130, which allows better control over side-channel leakage. The cryptographic math unit 130 not only provides for faster data processing that a general-purpose processor (such as a CPU) but has simple and clear data paths that are easier to secure.

Masking is applied in examples herein as a side-channel attack countermeasure. The cryptographic system 110 provides for hardware-accelerated cryptographic operations with integral hardware masking support. The masking may be configured to meet the requirements of the "non-invasive attack countermeasures" described in the FIPS 140-3 and ISO 19790 security standards, which are both incorporated by reference herein, (e.g., those defined in Section 7.8 of ISO/IEC 19790: 2012(E)). Testing of the effectiveness of countermeasures such as masking as described herein may be performed using laboratory procedures such as those described in ISO/IEC 17825: 2016(E) "Testing methods for the mitigation of non-invasive attack classes against cryptographic modules", which is incorporated by reference herein, and more generally called Test Vector Leakage Assessment (TVLA).

Fast Iterated Hash Example

Figure 4:
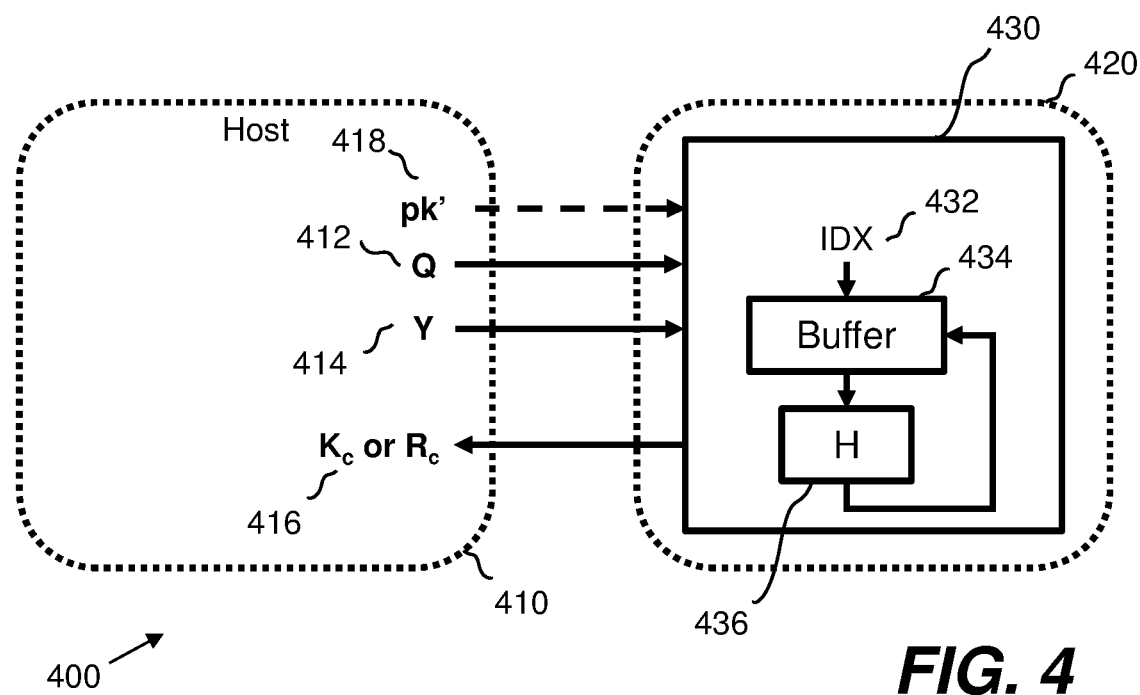
FIG. 4 is a schematic illustration showing an example Extendible-Output Function—XOF—unit being used to compute a fast iterated hash value.

FIG. 4 shows an example 400 of a cryptographic system, such as the cryptographic system 110 of FIG. 1, being used in a fast iterated hash mode. This mode may be provided to support Hash-Based Signatures (HBS), such as the signatures described in the National Institute of Standards and Technology (NIST) Special Publication 800-208-"Recommendation for Stateful Hash-Based Signature Schemes", which is incorporated by reference herein. Examples of hash-based signature schemes that may be implemented using the present iterated hash mode include one or more of: Leighton-Micali Signatures (LMS), the Hierarchical Signature System (HSS), the extended Merkle Signature Scheme (XMSS), and the multi-tree XMSS scheme ($XMMS^{MT}$). This mode may be part of an optional implementation.

FIG. 4 shows a computing system 410 (the "host") that is communicatively coupled to the cryptographic system 420, which may comprise the cryptographic system 110 of FIG. 1. In the present fast iterated hash mode, the cryptographic system 420 acts as a hash generator 430 that receives inputs from the host 410 and provides a cryptographic output. The output may be used for computing Winternitz hash chains and various types of Merkle trees. A control processor and address generator of the hash generator 430 (e.g., the processor 152 of the control unit 150 and the address generator 134 in FIG. 1) allow evaluation of hash chains without loading and storing individual hash results to the host 410. In at least the LMS, HSS, and XMSS-based signatures described above a majority of the time to provide the signatures is taken up with computation of Winternitz one-time signatures and Merkle trees that are iterations of the hash function. Hence, by providing a fast iterated hash mode, the cryptographic system 420 can speed up computation of these signatures.

In FIG. 4, the host 410 provides at least an initial hash Q 412 and a message signature Y 414 to the hash generator 430. The initial hash Q 412 may be computed by the host 410 from a public key pk and a message M, e.g. via H(f(pk)|M) where H( . . . ) is a hash function, f( . . . ) is a public key function. This form of hashed message may be specified by the HBS algorithm being used. For example, many HBS schemes generate a message hash (Q) as a hash of a concatenation of a prefix derived from a public key and the message M. The hash generator 430 also receives a message signature Y 414. In certain examples, the public key pk or a parsed version of the public key pk' may also be passed to the hash generator 430 (e.g., as shown by 418 in FIG. 4). In other examples, the message M may be passed (e.g., instead of the initial hash Q 412) with a version of the public key and the hash generator 430 may compute the initial hash Q. The hash generator 430 then operates to provide a root candidate (Re) or public key candidate ($K_c$) 416 that results from iterated hashing of the initial hash Q. The host 410 may then compare the candidate $R_c$ or $K_c$ with R or K, e.g. determine whether the candidate is a component of the public key pk.

The example of FIG. 4 shows one way in which the cryptographic system of the described examples may be used to support signature algorithms for post-quantum cryptography. For example, many such signature algorithms use randomised hashing. In these cases, a computing system may need to process a public key or a randomised tag before hashing a message body (e.g., using a randomised hashing function). A hashed message may thus need to be computed as hm=H(pk|M) or H(tag|M) where M is the (raw) message, pk is the public key, tag is the randomised tag, and H is a hash function. The hash function may be a SHA3 hash function. In this case, the hash may be computed using the cryptographic system 110 where permutations implemented by the permutation unit 140 are used to compute the SHA3 hash function.

For HBS verification, the cryptographic system may operate in conjunction with the host system, e.g. by providing assistance to certain key generation and signature processes. In these cases, outputs may be finalised by the host system using intermediate variables that are computed more efficiently by the cryptographic system.

In certain cases, the arithmetic unit 136 may not be directly involved in a Winternitz operation, but the cryptographic math unit 130 allows memory areas to be copied from one location to another efficiently even if there is no arithmetic (e.g., to and from the matrix memory 132). The matrix memory 132 may be used to store sensitive data in an access-controlled manner, and the cryptographic math unit 130 may be used to aid the formatting and preparation of hashes for Winternitz hash sequences and computation of hash-based signatures (and their verification).

It will be noted that different cryptographic algorithms may use different terminology while utilising shared or similar sets of operations. In general, the algorithms may involve iterating over a hash a number of times until there is a "match", which in the present case may be a match between a key candidate supplied by the hash generator 430 (e.g., R. or $K_c$ (416) and data held by the host (e.g., R or K). Certain implementations may supply templates to the buffer 434, where the templates are byte sequences that contain unchanging parts of the hash input for the iteration including padding and formatting bytes. The processor 152 may prepare these templates. The index IDX 432 may be a changing index number that represents different locations in the input that is used for loading the hash output back into a correct location of the input. Using templates and only iterating defined portions of the hash accelerates the process as the time preparing the input by the processor may be greater than the hash unit computing the hash. Also, hash inputs are often very similar to each other with few moving components in addition to the "hash feedback". In these cases, preparing a template for the output and only iterating certain portions can accelerate the hash iteration.

Example Cryptographic Operations

The cryptographic system described herein has a number of components that may be configured to implement particular cryptographic operations. For example, the components shown in FIG. 1 provide a set of hardware components that may be suitable configured by (firmware) computer program code for the control unit 150. The cryptographic math unit 130 and control unit 150 thus allow for a controllable and configurable hardware implementation of different cryptographic operations, e.g. for accelerated implementation as compared to the external computing system. Different cryptographic operations may be supported (and functionality extended) via firmware updates that include different hardware control configurations.

Each cryptographic operation in a set of available cryptographic operations may be configured (e.g. as a programmed function) to read data from a set source registers (e.g., as loaded from the matrix memory 132 using addresses generated by the address generator 134), perform a set of computations (e.g., via the arithmetic unit 136 and/or the permutation unit 140), and then output the result to at least one destination register (e.g., where it may then be loaded back into the matrix memory 132 using an address generated by the address generator 134). Often arithmetic for post-quantum cryptography involves hundreds of repetitions of the same function, and so these may be advantageously and securely implemented using a pipelined configuration (e.g., as shown in FIG. 2) and masking (e.g., as shown in FIG. 3) without hazards or performance issues.

In certain implementations, a low-level bus-independent driver programming interface may be provided for the cryptographic system. This programming interface may, for example, be provided using a C-language Hardware Abstraction Layer (HAL). The HAL may also provide access to cryptographic test functionality. In certain cases, cryptographic operations that are provided by the cryptographic system are represented using HAL function classes. The cryptographic system may thus provide a mapping between values written to control registers (such as the set of control registers 124 in FIG. 1) and a set of HAL function classes. Cryptographic functions may be initiated by the external computing system without directly passing plaintext data to the cryptographic system.

In certain examples, the cryptographic system is configured to perform one or more of key establishment functions and digital signature functions. The digital signature functions may include stateful hash-based signature functions (e.g., those implemented using the permutation unit 140 as described above). The key establishment functions may provide for key-based encryption and/or decryption functions. The digital signature functions may include one or more of digital signature generation and digital signature verification. The cryptographic system may be configured to one or more of: lattice post-quantum key establishment functions; code-based post-quantum key establishment functions; lattice post-quantum digital signature functions; code-based post-quantum digital signature functions; hash-based post-quantum digital signature functions; multivariate post-quantum digital signature functions; and hierarchical signature system functions. These functions may be implemented without passing plaintext data to the cryptographic system, i.e. the cryptographic system only accesses encrypted data via the cryptographic registers 122.

Key establishment functions, as described above, may be defined as a set of HAL groups (e.g., as a set of kem—key establishment—functions). For example, a HAL group (e.g., _kem_kg) may provide for private-public keypair generation, e.g. (pk, sk)=keygen(seed) where sk is a secret or private key, pk is a public key, and seed is an (optional) explicit seed parameter for the generation. Another HAL group (e.g., _kem_enc) may provide for encapsulation and/or encryption functions, e.g. (ct, ss)=encaps(pk, seed) where ct is a generated ciphertext, ss is a generated shared/shareable secret, pk is a public key and seed is an (optional) explicit seed parameter. A further HAL group (e.g., _kem_dec) may then provide for decapsulation and/or decryption functions, e.g. ss=decaps(ss, sk) where ss is a generated shared/shareable secret, ss is an input shared/shareable secret and sk is a secret or private key. The seed parameter may be sourced from a random bit generator as indicated within cryptographic standards. An un-masked length of a seed is generally 32 to 96 bytes (depending on the cryptographic algorithm being implemented). Seed determinism may allow for standardised testing of cryptographic functions. Masking randomness for masked operations may not be deterministic (e.g., following the methods and systems described above), and so in these cases seed parameters may be merely contributory (e.g., as entropy bits).

Certain post-quantum key establishment functions may not have the "commutative symmetry" of traditionally used Diffie-Hellman cryptographic algorithms; in these examples, encapsulation and decapsulation may involve different computations. In post-quantum key exchange flows, a first user keypair may be ephemeral, where shared secrets (the ss variables above) may be used by both parties to derive session keys. For example, the commutative symmetry of traditional (e.g., Diffie-Hellman) algorithms means that two parties typically perform similar operations to arrive at a shared secret (e.g., raising to a power); however, in post quantum algorithms the two parties typically perform completely different operations to arrive at a shared secret with one party being an "initiator" that first sends a message. In certain cases, an alternatively keypair generation function (e.g., kem_kg_eph) may be provided that does not output the secret key sk but that retains it within the cryptographic system for an immediately following decryption operation (e.g., kem_dec_eph). For post-quantum public key encryption flows, a generated keypair may be stored for long-term use. In this case, encapsulation may be invoked to create a fresh shared secret (i.e., ss) for each message, and these shared secrets may be used to derive keys for message payload encryption and decryption (e.g., for the Advanced Encryption Standard—AES—in an authenticated encryption with associated data—AEAD—mode). Due to countermeasures against (adaptive) chosen-ciphertext attacks, certain post-quantum key establishment functions may have implicit failure modes where decapsulation of malformed or illegal ciphertext may not explicitly fail but may result in a specially constructed, random ss value. In certain cases, post-quantum key establishment functions may receive or access additional flag variables to determine a set of side-channel countermeasures to be implemented.

In a similar manner to the post-quantum key establishment functions discussed above, a set of digital signature functions may also be defined as a set of HAL groups (e.g., as a set of sig functions). For example, a HAL group (e.g., _sig_kg) may provide for private-public keypair generation, e.g. (pk, sk)=keygen(seed) where sk is a secret or private key, pk is a public key, and seed is an (optional) explicit seed parameter for the generation. Another HAL group (e.g., _sig_sig) may provide for detached signature generation, e.g. sig=sign(hm, sk, seed) where sig is a generated signature, hm is a hashed message, sk is a secret or private key and seed is an (optional) explicit seed parameter. A further HAL group (e.g., _sig_ver) may then provide for detached signature verification functions, e.g. {T, F}=verify (sig, hm, pk) where sig is an obtained digital signature, hm is a hashed message, and pk is a public key, where the verification function returns True or False (i.e., verified or not verified).

For hash-based stated signatures, a set of HBS functions may be defined as a set of HAL groups (e.g., as a set of hbs functions). For example, a HAL group (e.g., _hbs_kg) may provide at least assistance for private-public keypair generation, e.g. (pk, sk)=keygen(seed) where sk is a secret or private key, pk is a public key, and seed is an (optional) explicit seed parameter for the generation. Another HAL group (e.g., _hbs_sig) may provide for at least assistance in detached signature generation, e.g. sig=sign(hm, sk, seed) where sig is a generated signature, hm is a hashed message, sk is a secret or private key and seed is an (optional) explicit seed parameter. A further HAL group (e.g., _hbs_ver) may then provide for detached signature verification functions, e.g. $pk_c$=verify(sig, hm, pk) where sig is an obtained digital signature, hm is a hashed message, and pk is a public key, where the verification function returns a candidate component for a public key $pk_c$ as an output (e.g., as describe with reference to FIG. 4 above).

Figure 5:
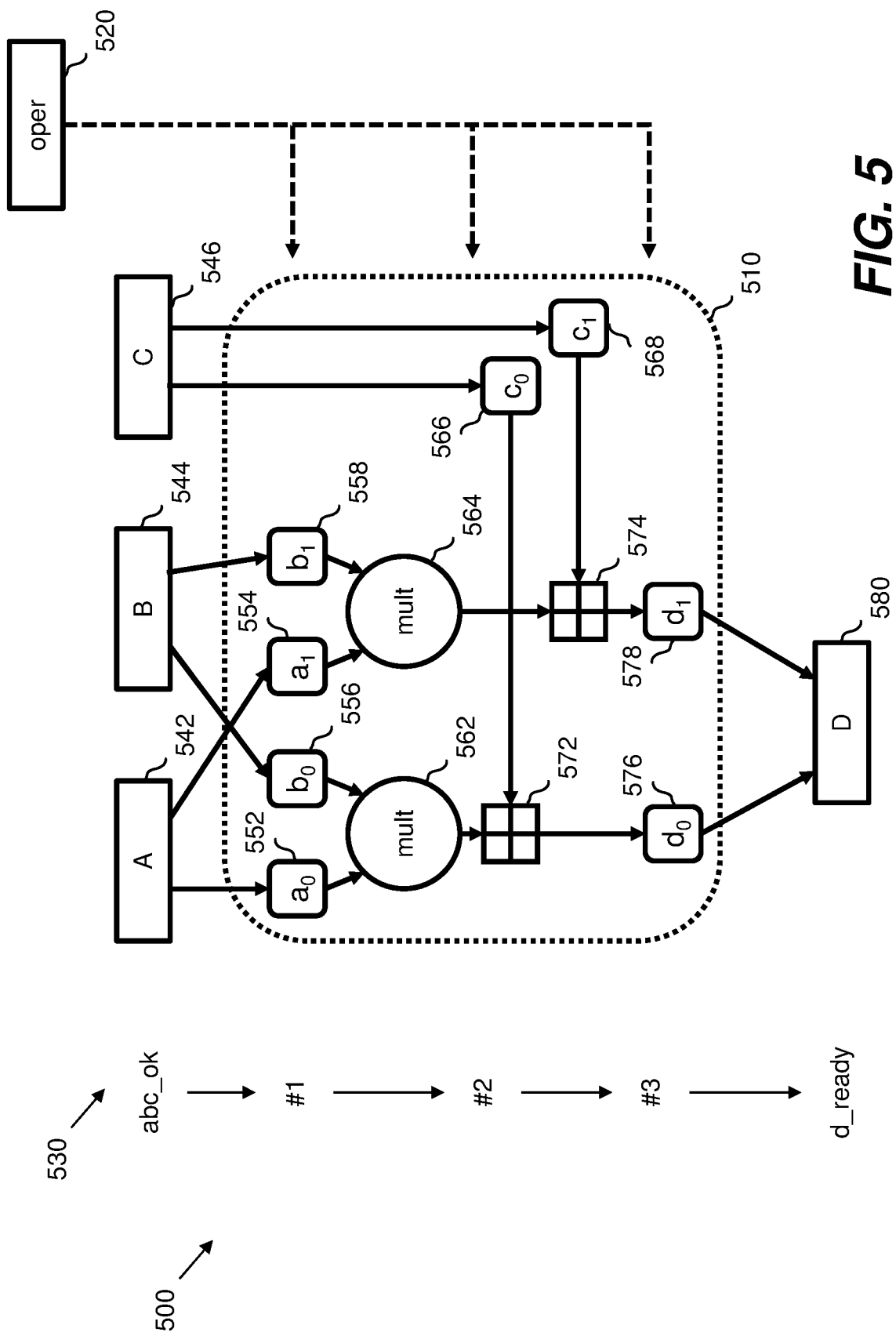
FIG. 5 is a schematic illustration showing execution of a pipelined cryptographic function according to an example.

FIG. 5 shows an example 500 of a configured cryptographic operation 510 that may be used to perform lattice-based post-quantum cryptography. Similar to FIG. 2, one or more "oper" instructions 220 (e.g., as supplied by the operation control unit 138) control the sub-operations that make up the configured cryptographic operation 510 and addresses that are used during the operation 510 are provided as one or more address streams 530 by the address generator 134. The "oper" instruction(s) specify the pipeline operations for the entire "blitter" operation. In this example, as per the example of FIG. 2, three source registers are used—A, B, C—542, 544 and 546. The present cryptographic operation 510 is a multiply-add operation that may be used to implement SABER and NTRU cryptographic algorithms. In this case, the cryptographic operation 510 is implemented as a pipelined arithmetic combiner that computes two parallel modulus $2^n$ multiply-add operations. First, the contents of the A source register 542 are decomposed into two portions $a_0$ and $a_1$ shown as 552 and 554. A similar procedure is performed to decompose the contents of the B source register 544 into two portions $b_0$ and $b_1$ shown as 556 and 558. The first portions from the A and B source registers, $a_0$ and $b_0$—552 and 556—are provided as input to a first multiply operation 562 and the second portions from the A and B source registers, $a_1$ and $b_1$—554 and 558—are provided as input to a second multiply operation 564. The portions in this example may comprise data shares in certain configurations. The results of each multiplication are then added to respective decomposed portions $c_0$ and $c_1$ (shown as 566 and 568) of a C source register 546 at blocks 572 and 574 (showing a "boxed addition") to generate destination portions $d_0$ and $d_1$ (shown as 576 and 578), which are then combined to generate an output for a destination register D 580. Blocks 572 and 574 represent a "wrap-around" or modulo q operation (e.g., as described in other examples). The value of q may vary according to the cryptographic algorithm (for SABER $q=2^{13}$). Overflow carry from the addition may be ignored. The example of FIG. 5 is also applicable to masked implementations. In this case, large "blits", e.g. arithmetic operations of lattice cryptography algorithms, may be masked if secret keys are involved. In certain cases, it is often possible to perform a ring multiplication operation (e.g., a "blit") on one mask share, before proceeding to the next mask share, where the shares need only be combined at specific points within the algorithmic flow.

Further Detail on an Example Control Unit

In certain examples, the control unit 150 acts as a lightweight controller for the cryptographic math unit 130. For example, information flow and execution of post-quantum cryptography via operations of the cryptographic math unit 130 may be controlled by the processor 152 of the control unit. In one case, the processor 152 comprises a RISC core and implements a corresponding RISC instruction set (such as the RV321 instruction set). In certain examples, the processor 152 executes instructions stored within the ROM 156 (e.g., stored as a ROM image). The control unit 150 (including the processor 152) may be triggered using an interrupt-like mechanism based on signals received at the set of bus interfaces 120 (e.g., based on signals from a bus manager of said interfaces).

In use, the cryptographic system 110 may be configured such that secret data (e.g., SSPs) do not pass through the processor 152. Instead, the control unit 150 arranges for a series of one or more defined operations (e.g., as controlled via the OPER control signals) to be executed by the cryptographic math unit 130 (e.g., as shown schematically in at least FIGS. 2, 4 and 5). Certain cryptographic operations may be programmed using (or as) subset B (BitManip) and/or subset K (scalar cryptography) RISC instruction set extensions. Certain functions, such as the monitoring of internal variables described with reference to FIG. 6 below, may be implemented as a set of additional proprietary custom instructions for the processor 152.

To prevent secret data passing through the processor 152, post-quantum cryptographic algorithms to be implemented using the cryptographic system 110 may be configured as a set of condition-free instructions to be executed by the processor 152. In certain cases, the control unit 150 may be able to access the matrix memory 132, but only when the cryptographic math unit 130 is not actively performing an operation (e.g., the processor 152 may be prevented from accessing the matrix memory 132 during a "blit" or series of "blits"). Access to the matrix memory 132 outside of the operation of the cryptographic math unit 130 may be provided, for example, while performing self-tests during initialisation, when parsing public keys and/or while XOR padding data blocks for an implementation of Keccak operations.

Although examples herein have been described with reference to a system-on-chip implementation, it should be noted that the functionality may be emulated by a full system emulator. In this case, the full system emulator may emulate the components shown in FIG. 1 (i.e., the full cryptographic system 110), including the control unit 150, the cryptographic math unit 130 and other peripherals. Emulation may allow for detailed implementation profiling and security analysis in addition to convenient development flow in comparison to circuit simulation.

The cryptographic system described herein may be easily programmed to support various use cases and constraints (e.g., additional functionality may be provided via a firmware update of an image stored in the ROM 156 following manufacture). Supported cryptographic algorithms may comprise but are not limited to: NIST structured lattice algorithms including DILITHIUM, KYBER, SABER and NTRU; the German Bundesamt für Sicherheit in der Informationstechnik (BSI) developed algorithms including FrodoKEM and Classic McElicce; and NIST SP 800-208 Hash-Based Signature Algorithms such as LMS, HSS, XMSS, and $XMSS^{MT}$.

In certain cases, support may also be provided for non-post-quantum ("classical") cryptography such as the Rivest-Shamir-Adleman (RSA) algorithm and/or Elliptic Curve cryptography. It should be noted that certain cryptographic operations implemented by the cryptographic system may form primitives for a plurality of different cryptographic algorithms, including both post-quantum and classical algorithms. Security parameters for classical cryptographic algorithms may be chosen using flow-chart characterisations processes enabled by the cryptographic system. Certain functions, such as large integer arithmetic may not be needed if Elliptic Curve and/or RSA functionality is provided by other hardware of the external computing system (which in certain cases may communicate with the cryptographic system, e.g. over one or more of buses 126, 128 or 170).

The design of cryptographic system may guarantee literal constant-time operation for implementational security. The masked mode of operation described herein may further provide robust protection against non-invasive physical attacks. The masked mode of operation may thus meet and/or surpass ISO/IEC 17825 Level 3 and 4 requirements. Importing and exporting of secret data (e.g., SSPs including secret keys) may be configured using masked data shares, thus allowing secure key storage and keying of external symmetric components such as AES encryption engines. In certain implementations, the cryptographic system may provide FIPS 140-3 design features such as zeroization, self-tests, and integrity tests.

Example Variable Tainting Method

As well as the cryptographic system described with reference to the examples above, a method of operating a cryptographic system may also be provided. While particularly suited to the cryptographic system 110 of FIG. 1 and other examples, this method may nonetheless also be applied to cryptographic systems that differ from the examples described herein, such as any cryptographic system configured to perform cryptographic operations.

In the present example, a method of operating a cryptographic system while performing cryptographic operations is provided. The cryptographic operations may be post-quantum cryptographic operations and the cryptographic system may perform said operations for a communicatively-coupled computing system. For example, the cryptographic system may comprise a system-on-chip for performing post-quantum cryptography.

In general, the method comprises: defining a set of attributes to annotate at least a set of internal variables for the cryptographic system; performing one or more cryptographic operations upon the set of internal variables; and providing an indication when at least one of conditional instructions and data access operations from outside the cryptographic system are performed on internal variables having a particular value. For example, each of the set of attributes may have one of at least two values, the at least two values comprising a first value indicating secret data and a second value indicating non-secret data. These may be referred to as "red" and "black" variables for those familiar with cryptographic convention. Performing one or more cryptographic operations upon the set of internal variables may include applying one of the at least two values to data generated or received by the cryptographic system and updating attribute values based on arithmetic operations performed by an arithmetic unit of the cryptographic system (e.g., that implements operations for post-quantum cryptography). The indication may be provided when certain instructions are performed on internal variables having the first value, e.g. on "red" secret variables. By running this method, it can be ensured that the cryptographic system is not leaking secret information. Additionally, the method may be used when testing new cryptographic operations (e.g., for firmware updates) to ensure that these do not (accidentally) leak secret information.

Figure 6:
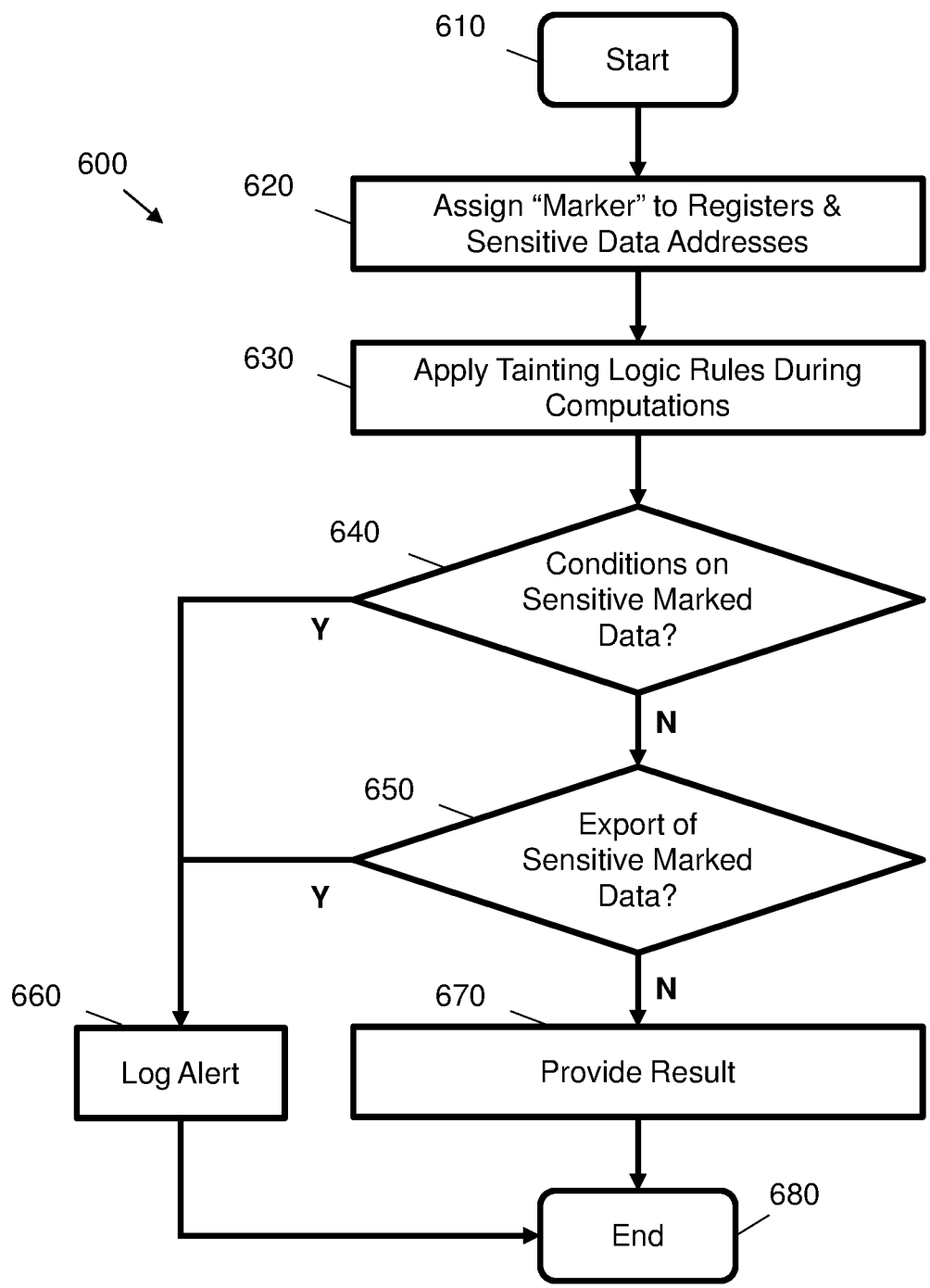
FIG. 6 is a flow diagram showing a method of performing a cryptographic operation according to an example.

FIG. 6 shows a specific example 600 of the above-described method. The method 600 begins at block 610. At block 620, attributes in the form of defined "markers" are associated with one or more of data registers (including those within the set of bus interfaces 120 and matrix memory 132). In one case, an attribute in the form of a flag bit is assigned to architectural registers (e.g., all RISC-V registers used by the control unit 150) and internal memory (e.g., at least matrix memory 132) data words. When a binary flag is used one of the binary values may represent "black" or non-secret data and the other of the binary values may represent "red" or secret data. In certain examples, zero-ed (or zeroised) values, non-secret values (such as public keys) and/or encrypted variables may be considered "black". Applying the annotations to variables may be considered a form of "tainting" or "tinting".

At block 630, a set of tainting logic rules are applied during cryptographic operations, such as computations performed by the cryptographic math unit 130. For example, the flag values assigned at block 620 may be transferable and may follow the data values as they are manipulated within the cryptographic system (e.g., a data copy from one address to another will also copy across the flag value to the new location or register). In certain cases, the set of tainting logic rules may include monitoring the results of all arithmetic operations applied at least by the arithmetic unit 136. Annotations indicating secret data (e.g., "red" tainting) may be tracked such that all results of operations involving secret data are also annotated as secret (e.g., by applying an "or" operation to the annotations of inputs to the operations). For example, an operation on a "red" annotated input and a "black" annotated input results in a "red" annotated output. The set of tainting logic rules may be applied automatically by the control unit 150 and may be invisible to general user processes. In certain cases, an annotation indicating non-secret data (e.g., a "black" annotation) may be set only in response to a predefined set of operations being performed on secret data (e.g., with a "red" annotation). For example, a flag may only be changed from "red" to "black" (e.g., 1 to 0) if a zeroization operation is performed on the "red" data or if a specially authorised custom instruction is performed.

Returning to FIG. 6, during use of the cryptographic system that is apply the tainting, checks may be made to see if certain conditions are breached with respect to the annotated variables. At block 640, a check is performed to determine if any conditional operations are performed on data annotated as secret (e.g., "red" data). For example, conditional jumps, loads and/or stores performed on "red" variables may be prohibited to eliminate deliberate or unintentional leakage of sensitive data via the timing channel. At block 650, another check is performed to determine if any data annotated as secret (e.g., "red" data) is exported from the cryptographic system. For example, to prevent the leaking of secret information only data annotated as non-secret (e.g., "black" data) may be exported from the cryptographic system. In certain cases, "red" data may be exported once it has been "secured" or converted to "black", e.g. once an encryption operation has been performed on the data. In FIG. 6, if the checks at either block 640 or block 650 indicate that conditional operations have been performed on secret data or that secret data has been exported then an alert is at least logged at block 660. If the checks at block 640 and block 650 are met (i.e., there is no exception on "red" data), then a result of the cryptographic operation is provided at block 670. In certain cases, the result may only be provided at block 670 if the checks are met. In other cases, the result may still be provided but the alert logged at block 660 may also be provided with any output. At block 680, the method 600 ends. During use, at least blocks 620, 630, 640 and 650 may be repeated continually as computations are performed on data and as data is loaded and exported.

The tainting method described herein may only incur a modest silicon area or power implementation cost. For example, additional register bits may be provided to store the aforementioned flag bit that is used for the annotation. The set of tainting logic rules may be relatively simple (e.g., using a simple OR operation on "red" data) and so have limited computational overhead. Local RAM, such as one or more of matrix memory 132 and control unit RAM 154, may also be modified to store the annotations (e.g., via a set of reserved 1-bit memory locations that are associated with respective sets of stored data words). The method may be applied both within a hardware implementation and a full system emulator—e.g., both may operate in the same manner such that tracking and monitoring may be performed both in practice and during testing.

As an example, a key generation process may involve generating a public-private key pair. During this process, generated public key data may be immediately assigned a "black" flag value as it is non-secret; however, private key data may be initially assigned a "red" flag value and may only be assigned a "black" flag value after it is "wrapped" using a key-encryption key (i.e., KEK-wrapped) to form a ciphertext key blob. Following assignation of the "black" flag value the ciphertext key data may then be exported from the cryptographic system.

As described in examples herein, the cryptographic system may comprise a secret data bus interface for the loading of secret data via a system bus of the communicatively-coupled computing system. In this case, data loaded from the secret data bus interface (e.g., 122 in FIG. 1) into the cryptographic system is initially assigned a first ("red") value. In certain cases, outputs of all arithmetic operations involving internal variables having the first value (e.g., "red" variables) are assigned the first value (e.g., are annotated as "red"). In certain cases, converting from the first value (e.g., "red" variables) to the second value (e.g., "black" variables) is only performed when performing a predefined subset of arithmetic operations on the internal variables (such as zeroization or encryption). Values for the set of attributes may be stored using an additional bit for one or more registers in the cryptographic system or for data stored in a matrix memory of the cryptographic system.

Although the method of FIG. 6 has been described with reference to the cryptographic system 110 of FIG. 1, it may be used with any cryptographic system including those that comprise a security processor. In certain cases, the method may be applied to cryptographic operations that are performed with a conventional central processing unit of a computing system. The method may be applied to both post-quantum cryptographic operations and non-post-quantum (i.e., classical) cryptographic operations.

In general, the example of FIG. 6 provides a method of operating a cryptographic system while performing cryptographic operations. This method comprises defining a set of attributes to annotate at least a set of internal variables for the cryptographic system, each of the set of attributes having one of at least two values, the at least two values comprising a first value indicating secret data and a second value indicating non-secret data; performing one or more cryptographic operations upon the set of internal variables including applying one of the at least two values to data generated or received by the cryptographic system and updating attribute values based on arithmetic operations performed by the cryptographic system; and providing an indication when at least one of conditional instructions and data access operations from outside the cryptographic system are performed on internal variables having the first value.

In certain variations of this example, the cryptographic system may comprise a secret data bus interface for the loading of secret data via a system bus of the communicatively-coupled computing system, where data loaded from the secret data bus interface into the cryptographic system is initially assigned the first value. Outputs of all arithmetic operations may involve internal variables having the first value are assigned the first value. The method may comprise converting from the first value to the second value when performing a predefined subset of arithmetic operations on the internal variables. Values for the set of attributes may be stored using an additional bit for one or more registers in the cryptographic system or for data stored in a matrix memory of the cryptographic system.

Brief Summary of Example Features

Certain examples described herein provide a device (e.g., a cryptographic system or co-processor) that is able to perform post-quantum cryptography with masked arithmetic, i.e. data provided as masked data shares for side-channel protection. A masked mode of operation may utilise one or more of Boolean and arithmetic masking, and the device may provide for conversion between (at least these) different forms of masking. The described examples provide a novel cryptographic system structure or configuration that performs masking operations in a flexible and efficient manner to allow for both accelerated post-quantum cryptographic co-processing and high-security against side-channel attacks.

Certain examples described herein provide a device (e.g., a cryptographic system or co-processor) that is able to assist and/or accelerate cryptographic computations as well as perform certain full post-quantum cryptographic operations autonomously. For example, the device allows for public-key key establishment and encryption such as generation of a public-private key pair, encapsulation and/or encryption, and decapsulation and/or decryption. The device further allows digital signature functions such as generation of a public-private integrity key pair, signature generation and signature verification, as well as stateful hash-based signatures, such as assistance and/or acceleration of key generation, signature generation and/or signature verification functions. Such a device may be provided as a system-on-chip (e.g., integrated within a silicon design and/or provided as a separate FPGA/ASIC chip that may be attached).

Certain examples described herein provide a cryptographic system that is able to provide secure cryptographic computation. For example, one or more of the following post-quantum public-key encryption algorithms may be implemented: Classic McEliece, (CRYSTALS-) KYBER, NTRU, SABER, BIKE, FrodoKEM, HQC, NTRU Prime, SIKE, and Supersingular Isogeny Diffie-Hellman (SIDH); as well as one or more of the following post-quantum digital signature algorithms: (CRYSTALS-) DILITHIUM, FALCON, Rainbow, GeMSS, and Picnic. Further details of these algorithms may be found in available NIST publications for the "Post-Quantum Cryptography Project", and publications for the CRYSTALS project-"Cryptographic Suite for Algebraic Lattices-Kyber and Dilithium", which are incorporated by reference herein.

Certain examples described herein provide a device with a cryptographic math unit that implements a "blitter" accelerator structure. This structure may include address generators, multi-port memory, a permutation unit, and a pipelined arithmetic combiner with selectable functions. Certain examples also described an XOF or hash unit that is able to produce streaming output (e.g., for a SHAKE implementation) and/or iterate hashes to accelerate hash-based signatures, e.g. via Winternitz and/or Merkle modes. Certain examples described herein have a control unit that controls cryptographic operations without handling sensitive data (so-called "no-touch" operation). For example, the control unit may not have access to sensitive data in the cryptographic math unit during operation. Certain examples further provide a method by which a control unit or processor may provide security tracking of secret data throughout cryptographic operations; hence, a control unit or processor may track the flow of sensitive information within the cryptographic system but without having access to that data. Although certain examples describe a cryptographic math unit that is specially configured for cryptographic operations, it may also, in certain cases, provide additional vector processing functionality, e.g. the cryptographic system may also be used as a vector co-processor. In this case, a control unit of the cryptographic system may receive vector instructions (such as RISC-V vector instructions via control registers 124 of FIG. 1) and use the cryptographic math unit to implement these instructions. This may provide additional "bonus" functionality for accelerating certain mathematical operations.

The above examples are to be understood as illustrative. Further examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A cryptographic system to perform post-quantum cryptographic operations for a communicatively-coupled computing system, the cryptographic system being separate from the communicatively-coupled computing system and comprising:
a set of bus interfaces for communicatively coupling the cryptographic system to one or more system buses of the computing system;
a cryptographic math unit; and
a control unit comprising at least one processor and memory to control the cryptographic math unit, wherein the control unit is communicatively coupled to the set of bus interfaces via a first internal bus and is communicatively coupled to the cryptographic math unit via a second internal bus, wherein the first and second internal buses do not allow access to internal cryptographic data of the cryptographic math unit during the cryptographic operations,
wherein the cryptographic math unit comprises:
a matrix memory to store a multi-dimensional array of data;
an address generator configured to receive control signals from the control unit and to control access to data within the matrix memory;
an arithmetic unit to perform a set of defined arithmetic operations upon data within the matrix memory as accessed using the address generator; and
a permutation unit configured to generate a random bit sequence, wherein the permutation unit is controlled by the control unit and is communicatively coupled to the arithmetic unit,
wherein the cryptographic system is configured to perform masked arithmetic computations by decomposing secret data values into a plurality of data shares, the control unit being configured to control the arithmetic unit and the address generator to apply at least one of the set of defined arithmetic operations as a plurality of independent linear operations on the respective plurality of data shares.

2. The cryptographic system of claim 1, wherein the cryptographic system comprises a masked mode of operation and, for the masked mode of operation, is configured to:
receive, via the set of bus interfaces, an instruction from the communicatively-coupled computing system to perform a masked arithmetic computation as a single atomic operation;
determine, at the control unit, a first set of control signals to control access to data within the matrix memory and a second set of control signals to control at least one operation of the arithmetic unit to perform the masked arithmetic computation;
decompose secret data values stored within the matrix memory into a plurality of masked data shares by applying one or more random bit sequences from the permutation unit to the secret data values; and
repeatedly apply the at least one operation on each of the plurality of data shares using the arithmetic unit to perform the masked arithmetic computation, the at least one operation being applied as a plurality of independent linear operations.

3. The cryptographic system of claim 2, wherein the cryptographic system is configured to, for the masked mode of operation:
retrieve an encrypted secret data value via the set of bus interfaces; and
decrypt the encrypted secret data value and store the decrypted data value in the matrix memory for decomposition into the masked data shares,
wherein a result of the at least one operation is only exported to the communicatively-coupled computing system in an encrypted form.

4. The cryptographic system of claim 1, wherein the permutation unit performs an ASCON permutation.

5. The cryptographic system of claim 1, wherein the control unit comprises a set of condition-free instructions that are stored in the memory and executed by the processor.

6. The cryptographic system of claim 1, wherein the permutation unit comprises:
an Extendable-Output Function-XOF-unit to apply cryptographic operations to generate an indefinite-length output stream,
wherein the XOF unit is controlled by the control unit and is communicatively coupled to the arithmetic unit.

7. The cryptographic system of claim 6, wherein the XOF unit is configured to perform one or more of: a cryptographic absorb operation, a cryptographic squeeze operation, a cryptographic sampling operation and a cryptographic random masking operation.

8. The cryptographic system of claim 6, wherein the XOF unit comprises a n-bit cryptographic state that is separated into a plurality of data shares for masked arithmetic computations.

9. The cryptographic system of claim 6, wherein the cryptographic system is configured to compute one or more of Winternitz hash chains and Merkle tree data.

10. The cryptographic system of claim 1, wherein the cryptographic system is configured to compute hash-based signatures by iteratively hashing data stored in the matrix memory.

11. The cryptographic system of claim 1, wherein the cryptographic system is configured to perform one or more of:
key establishment functions including one or more of encryption and decryption;
digital signature functions including one or more of digital signature generation and digital signature verification; and
stateful hash-based signatures.

12. The cryptographic system of claim 11, wherein the cryptographic system is configured to:
implement one or more of: lattice post-quantum key establishment functions and code-based post-quantum key establishment functions;
implement one or more of: lattice post-quantum digital signature functions, code-based post-quantum digital signature functions, hash-based post-quantum digital signature functions, and multivariate post-quantum digital signature functions; and
implement hierarchical signature system functions.

13. The cryptographic system of claim 1, wherein the arithmetic unit comprises an arithmetic pipeline unit that receives control data indicating a selected operation to perform from the control unit and that performs the selected operation as a plurality of stages over time.

14. The cryptographic system of claim 13, wherein the plurality of stages comprise a plurality of parallel processing streams, the plurality of parallel processing streams receiving data accessed from the matrix memory.

15. The cryptographic system of claim 1, wherein the processor of the control unit is configured to receive vector instructions via the set of bus interfaces and convert the vector instructions into control instructions for vector operations for the cryptographic math unit.

16. The cryptographic system of claim 1, wherein the set of bus interfaces comprise:
a set of control registers writable by at least one processor of the communicatively-coupled computing system; and
a set of cryptographic registers for secret cryptographic data.

17. The cryptographic system of claim 1, wherein the control unit is configured to convert from a first masking format to a second masking format.

18. The cryptographic system of claim 1, wherein the control unit is configured to implement one or more of Boolean masking and arithmetic masking.

19. A method of operating a cryptographic system, the cryptographic system being separate from a communicatively-coupled computing system, the method comprising:
receiving, via a set of bus interfaces of the cryptographic system, an instruction from the communicatively-coupled computing system to perform a masked arithmetic computation as a single atomic operation;
accessing, by a control unit of the cryptographic system comprising at least one processor and memory, the instruction as written to the set of bus interfaces;
determining, at the control unit, a first set of control signals to control access to data within a matrix memory of the cryptographic system and a second set of control signals to control at least one operation of an arithmetic unit of the cryptographic system to perform the masked arithmetic computation;
decomposing secret data values stored within the matrix memory into a plurality of masked data shares by applying one or more random bit sequences from a permutation unit of the cryptographic system to the secret data values; and
repeatedly applying, using the first and second set of control signals, the at least one operation on each of the plurality of data shares using the arithmetic unit to perform the masked arithmetic computation, the at least one operation being applied as a plurality of independent linear operations,
wherein during at least said decomposing and said repeatedly applying, the control unit is prevented from accessing the contents of the matrix memory or arithmetic unit.

20. The method of claim 19, comprising:
exporting a non-secret result of the masked arithmetic computation to the communicatively-coupled computing system via the set of bus interfaces of the cryptographic system,
including, in a case where the masked arithmetic computation provides a secret result, encrypting the secret result prior to exporting.

21. The method of claim 19, comprising:
retrieving an encrypted secret data value via the set of bus interfaces; and
decrypting the encrypted secret data value within the cryptographic system; and
storing the decrypted data value in the matrix memory for decomposition into the masked data shares.

* * * * *